(12) United States Patent
Kiuchi et al.

(10) Patent No.: US 10,946,668 B2
(45) Date of Patent: Mar. 16, 2021

(54) PRODUCTION SYSTEM

(71) Applicant: FUJI XEROX CO., LTD., Tokyo (JP)

(72) Inventors: Yutaka Kiuchi, Kanagawa (JP);
Hajime Aikyo, Kanagawa (JP);
Mitsuhiro Matsumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/656,729

(22) Filed: Oct. 18, 2019

(65) Prior Publication Data

US 2020/0047516 A1 Feb. 13, 2020

Related U.S. Application Data

(62) Division of application No. 16/054,795, filed on Aug. 3, 2018, now Pat. No. 10,800,181.

(30) Foreign Application Priority Data

Mar. 23, 2018 (JP) .............................. JP2018-055736
Apr. 5, 2018 (JP) .............................. JP2018-073493

(51) Int. Cl.
*B41J 2/21* (2006.01)
*B41J 3/407* (2006.01)
*G06Q 10/08* (2012.01)
*B41J 2/16* (2006.01)
*B41J 2/195* (2006.01)

(52) U.S. Cl.
CPC ........... *B41J 2/2132* (2013.01); *B41J 2/1623* (2013.01); *B41J 2/195* (2013.01); *B41J 3/4075* (2013.01); *G06Q 10/087* (2013.01)

(58) Field of Classification Search
CPC ........ B41J 2/2132; B41J 2/1623; B41J 2/195; B41J 3/4075; G06Q 10/087; G06K 7/10; G06K 19/07; G06K 1/20; G06K 5/00
See application file for complete search history.

(56) References Cited

U.S. PATENT DOCUMENTS 8,690,057 B2 * 4/2014 Schoening ........... H01Q 1/2216
235/385

FOREIGN PATENT DOCUMENTS

JP   H03-256744 A   11/1991
JP   2000-326182 A   11/2000

* cited by examiner

*Primary Examiner* — Thinh H Nguyen
(74) *Attorney, Agent, or Firm* — Oliff PLC

(57) ABSTRACT

A production system acquires a plan of production of plural types of products to be produced through sequential attachment of prints, determines an order of production of the prints to be attached to the plural types of products, respectively, and produces the prints in the determined production order.

3 Claims, 17 Drawing Sheets

FIG.2

| INSPECTION ITEM | SPECIFIC EXAMPLE |
|---|---|
| LABEL PRINTING | CHARACTER LOSS·BLUR, BAR CODE ERROR |
| | COLOR SHIFT·DENSITY UNEVENNESS |
| | BLACK SPOT·COLOR SPOT, STREAKS, STAINS |
| LABEL PROCESSING | DIE-CUTTING DEFECT |
| | PRINT/REMOVAL MISALIGNMENT |
| | LAMINATE FAILURE |
| LABEL STICKING | LABEL PEELING·LIFTING |
| | STICKING MISALIGNMENT |
| | COMBINATION OF PRODUCT AND LABEL |
| PRODUCT | DEFECT IN PRODUCT ITSELF |

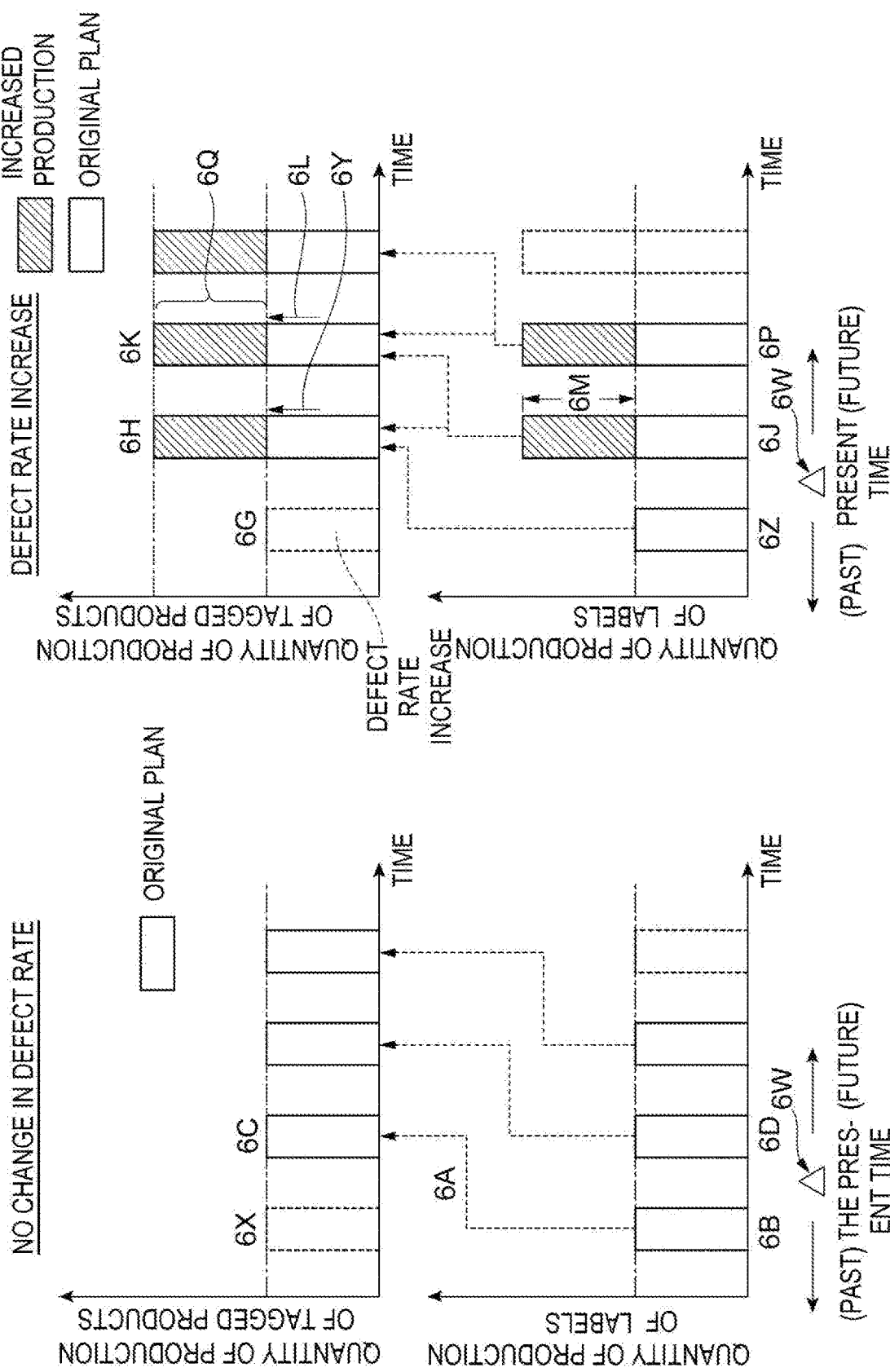
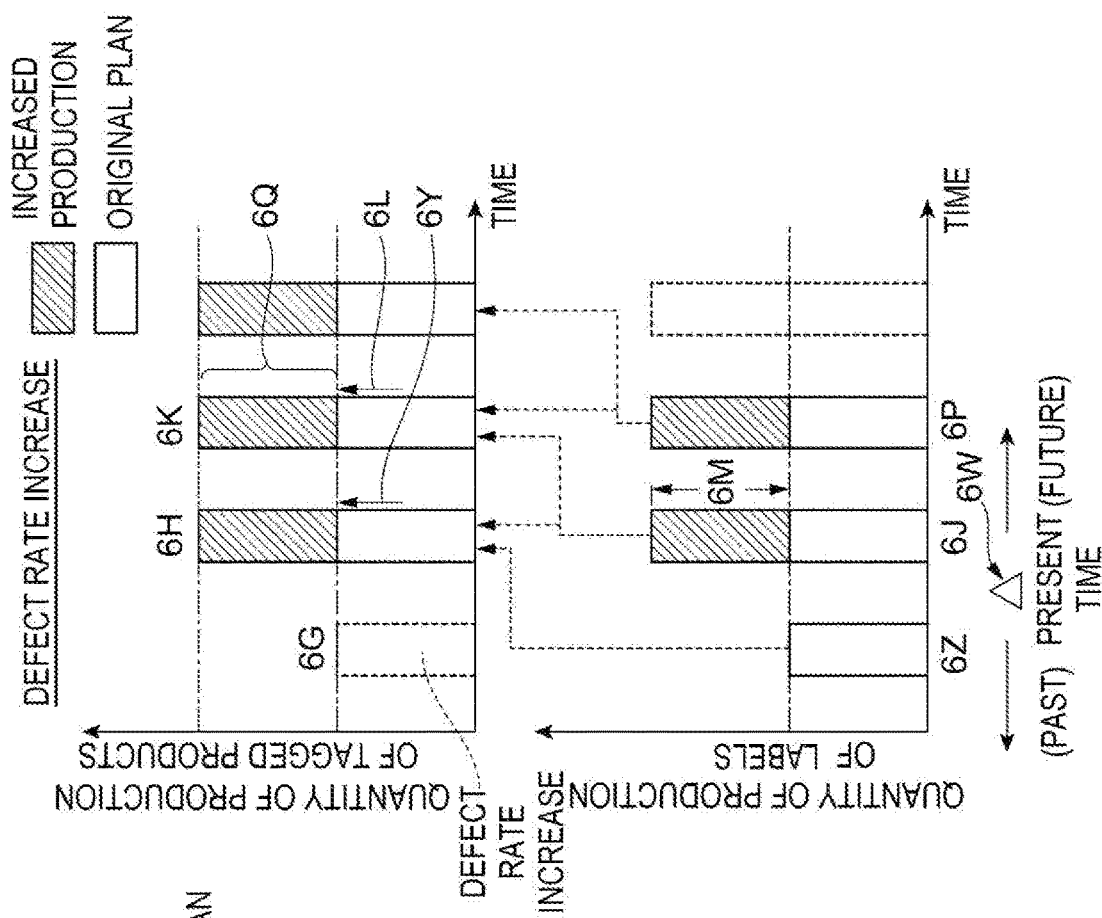

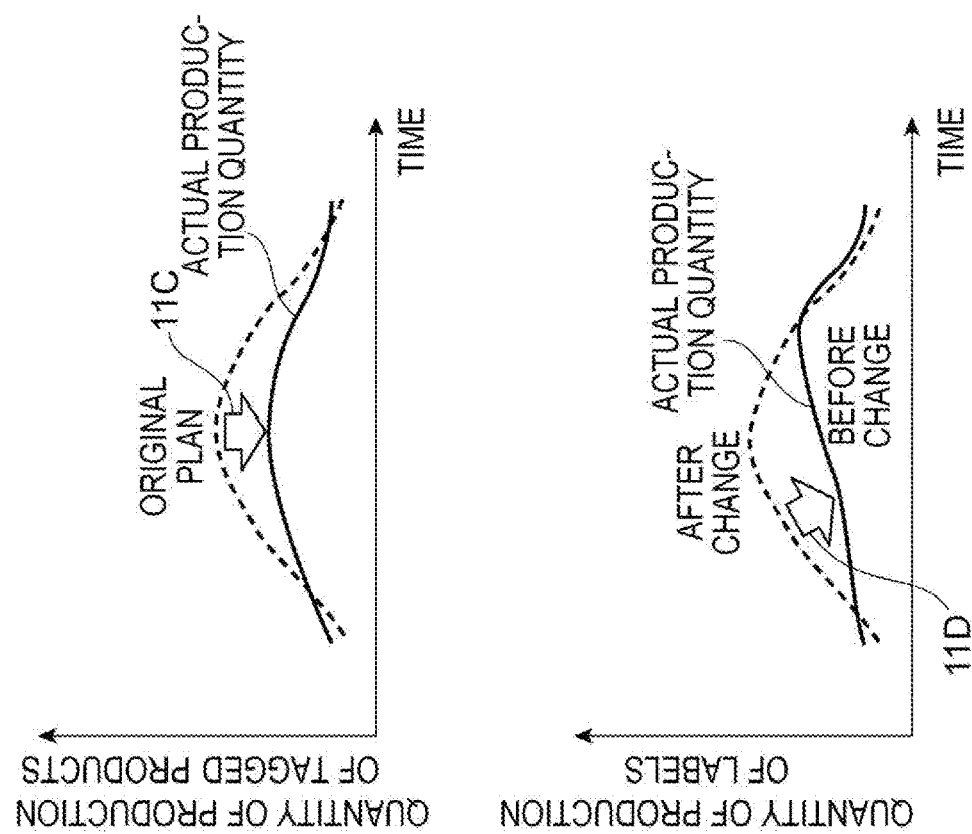
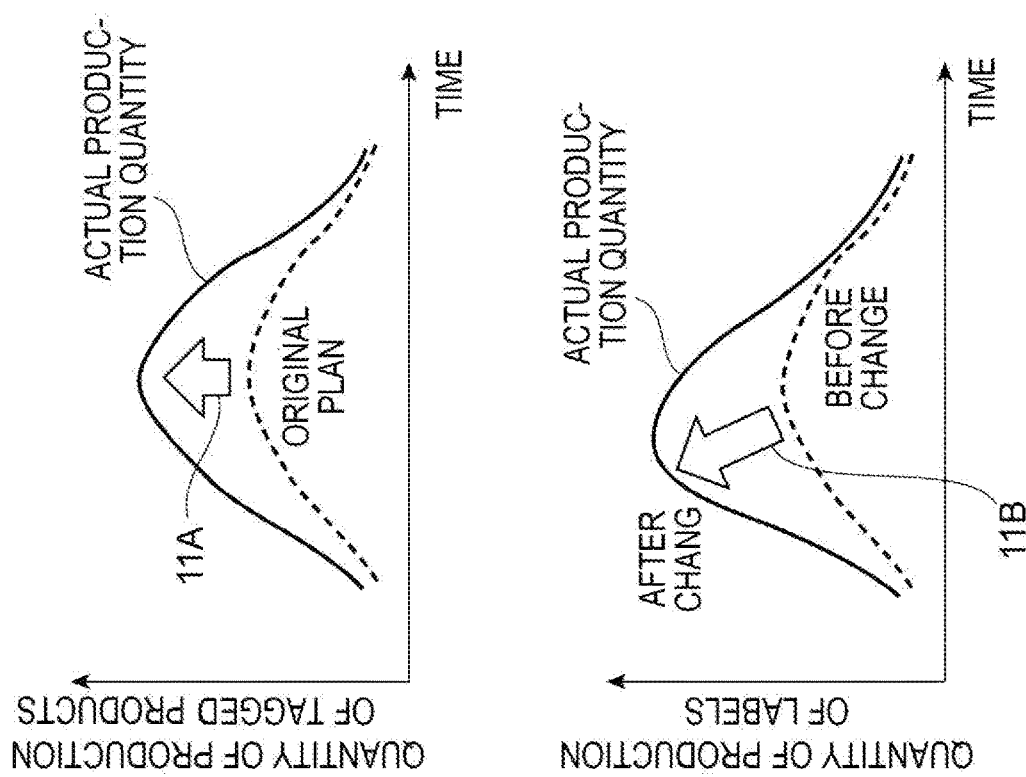

FIG. 13

| INSPECTION ITEM | SPECIFIC EXAMPLE |
|---|---|
| LABEL PRINTING | CHARACTER LOSS·BLUR, BAR CODE ERROR |
| | COLOR SHIFT · DENSITY UNEVENNESS |
| | BLACK SPOT·COLOR SPOT, STREAKS, STAINS |
| LABEL PROCESSING | DIE-CUTTING DEFECT |
| | PRINT/REMOVAL MISALIGNMENT |
| | LAMINATE FAILURE |
| LABEL STICKING | LABEL PEELING·LIFTING |
| | STICKING MISALIGNMENT |
| | COMBINATION OF PRODUCT AND LABEL |
| PRODUCT | DEFECT IN PRODUCT ITSELF |

PRODUCTION SYSTEM

CROSS-REFERENCE TO RELATED APPLICATIONS

This is a divisional application of U.S. patent application Ser. No. 16/054,795 filed Aug. 3, 2018, which is based on and claims priority under 35 U.S.C. § 119 from Japanese Patent Application No. 2018-055736 filed Mar. 23, 2018 and Japanese Patent Application No. 2018-073493 filed Apr. 5, 2018. The entire contents of all prior documents are incorporated by reference herein.

BACKGROUND

(i) Technical Field

The present disclosure relates to a production system.

(ii) Related Art

JP-A-03-256744 discloses a printing integrated production management system in which a host computer is connected to a process management unit, the process management unit is operated under management of the host computer, and information required for functions of the host computer is reported from the process management unit.

JP-A-2000-326182 discloses a process in which a planning unit organizes a plan of production by using a production speed stored in a storage device, and production is actually performed in a production machine based on the plan of production.

During the production of products tagged with prints, changes in the defect rate of the products may cause excess or deficiency of prints. If some prints are left over, the prints should be stocked, which is more likely to generate costs for stock management. Shortage in the number of prints may be addressed by producing prints in advance. In this case, however, prints should also be stocked, which is more likely to generate costs for stock management.

When plural types of products tagged with prints are produced, a predetermined number of prints may be prepared for each product in advance in order to prevent shortage of prints. In this case, however, the prints should be stocked, which is more likely to generate costs for stock management. In particular, if plural types of products are produced, plural types of prints should be prepared accordingly, which is more likely to increase costs for stock management.

SUMMARY

Aspects of non-limiting embodiments of the present disclosure relate to making sure that prints to be attached to products can be stocked without deficiency or excess in contrast to a case where prints are produced without consideration of product defect information.

Aspects of non-limiting embodiments of the present disclosure also relate to reducing the stock of prints to be attached to plural products, respectively, as compared to a case Where a constant number of prints predetermined for each product are surely stocked.

Aspects of certain non-limiting embodiments of the present disclosure overcome the above disadvantages and other disadvantages not described above. However, aspects of the embodiments are not required to overcome the disadvantages described above, and aspects of the non-limiting embodiments of the present disclosure may not overcome any of the problems described above.

According to an aspect of the present disclosure, there is provided a production system including: a production unit that produces prints with which products are to be tagged; an information acquisition unit that acquires defect information that is information on defect of tagged products that are products tagged with prints; and a changing unit that changes conditions of production of prints in the production unit based on the defect information acquired by the information acquisition unit.

BRIEF DESCRIPTION OF THE DRAWINGS

Exemplary embodiments of the present disclosure will be described in detail based on the following figures, wherein:

FIG. 2 is a view illustrating inspection items by an inspection device;

FIGS. 6A and 6B are views illustrating a relationship between the quantity of production of tagged products and the number of sheets of labels to be produced;

FIGS. 11A and 11B are views schematically illustrating the contents of the processing examples illustrated in FIGS. 6A and 6B and FIGS. 7 to 10;

FIG. 13 is a view illustrating inspection items by a product inspection device;

DETAILED DESCRIPTION

Hereinafter, an exemplary embodiment of the present disclosure will be described with reference to the accompanying drawings.

Figure 1:
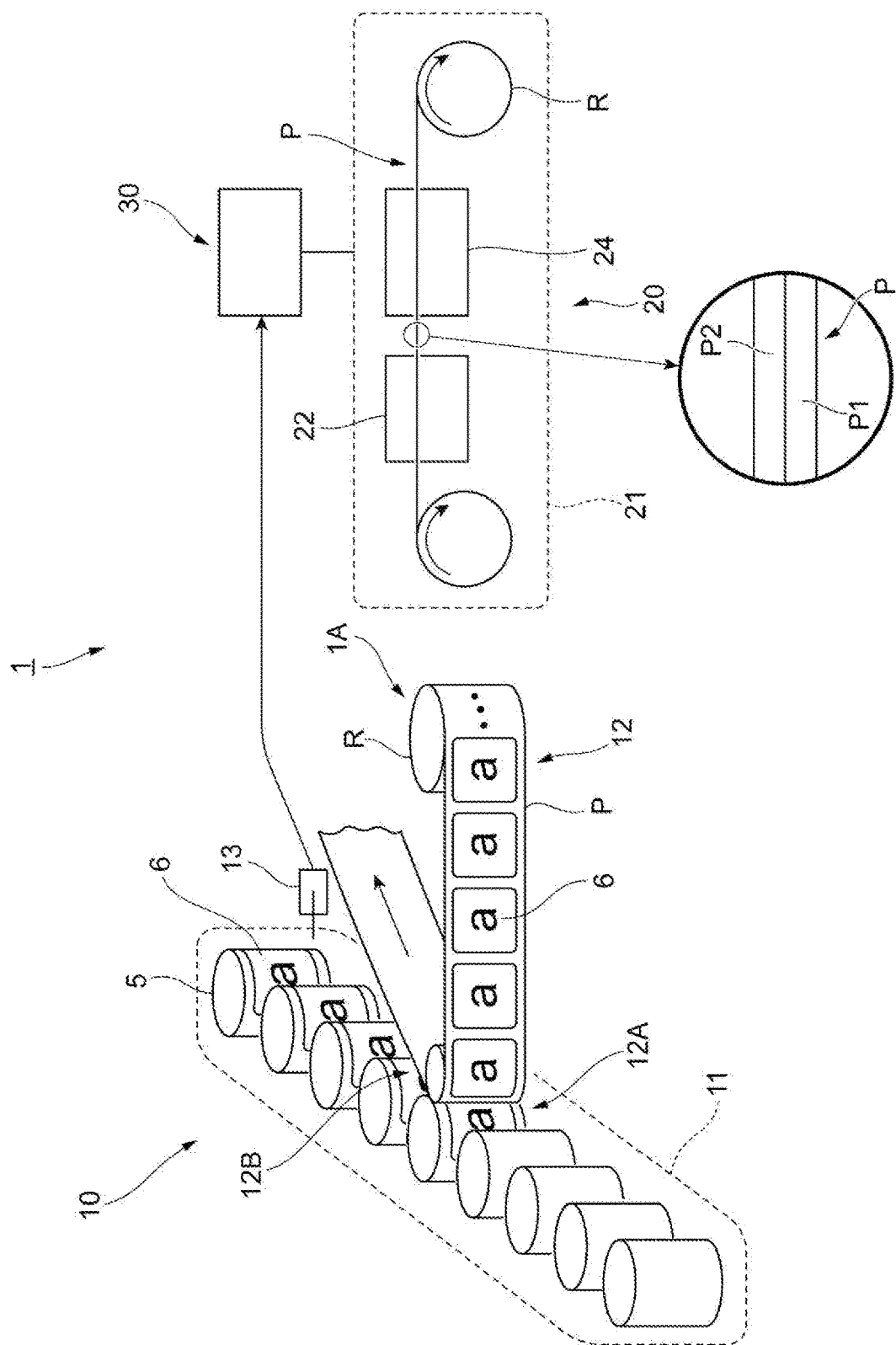
FIG. 1 is a view illustrating an overall configuration of a production system according to an exemplary embodiment.

FIG. 1 is a view illustrating an overall configuration of a production system 1 according to an exemplary embodiment.

In the production system 1 of the exemplary embodiment, a manufacturing apparatus 10 is provided to manufacture a product 5 tagged with a label 6 as an example of a print. In the production system 1, a print producing apparatus 20 is provided as an example of a production unit that produces the label 6.

In the production system 1, a management server 30 is provided to manage the manufacturing of the product 5 in the production system 1. The management server 30 is connected to the manufacturing apparatus 10 and the print producing apparatus 20 via a communication line such as a local area network (LAN).

The manufacturing apparatus 10 and the print producing apparatus 20 are provided in the same factory. The management server 30 may be provided in a factory where the manufacturing apparatus 10 and the print producing apparatus 20 are provided or provided in a place different from the factory.

In the manufacturing apparatus 10, a single type of product 5 may be manufactured, or plural different types of products 5 may be manufactured. When the plural types of products 5 are manufactured by the manufacturing apparatus 10, plural types of the labels 6 are produced in the print producing apparatus 20.

In the manufacturing apparatus 10, a transport device 11 is provided as an example of a transport unit that sequentially transports the products 5. In the manufacturing apparatus 10, a sticking device 12 is provided to stick a print to the product 5 transported by the transport device 11.

In the exemplary embodiment, as the print, the label 6 to stick to the product 5 is exemplified, and the label 6 sticks to the product 5 by the sticking device 12.

That is, in the exemplary embodiment, as a print to be attached to the product 5, the label 6 that is to be attached to the product 5 by adhesion is exemplified. The label 6 adheres to the product 5 by the sticking device 12.

In the manufacturing apparatus 10 of the exemplary embodiment, an inspection device 13 is provided to inspect the product 5 to which the label 6 has stuck.

In the exemplary embodiment, as the print to be attached to the product 5, the label 6 is described as an example, but besides, a packaging member such as a box or a bag may also be cited as an example of the print. In this case, in the print producing apparatus 20, the packaging member is produced.

Then, the manufacturing apparatus 10 manufactures a product 5 having the main part of the product placed in the packaging member or a product 5 having the main part of the product wrapped with the packaging member.

In addition, an example of the print may also be a tag provided with a string, which is attached to the main part of a product by being hung on the main part of the product.

In the print producing apparatus 2Q, a transport device 21 is provided to transport continuous paper P. In the print producing apparatus 20, an image forming apparatus (printing apparatus) 22 is provided to form an image on the continuous paper P transported by the transport device 21.

In the image forming apparatus 22, an image is formed on the continuous paper P by using an inkjet printing method, an electrophotographic method or the like. The image formation method is not limited to the inkjet printing method or the electrophotographic method, but other methods may be employed.

The transport device 21 performs delivery of the continuous paper P from the continuous paper P in a rolled state to transport the continuous paper P to the image forming apparatus 22. The transport device 21 further transports the continuous paper P on which image formation has been completed by the image forming apparatus 22. Then, the transport device 21 finally winds up the continuous paper P, to produce a roll R.

The continuous paper P of the exemplary embodiment is constituted by backing paper P1, and label paper P2 which is placed on the backing paper P1 via an adhesive. The image forming apparatus 22 forms an image on a portion of the label paper P2 in the continuous paper P.

In the print producing apparatus 20, a cutting device 24 is provided to cut the label paper P2. The cutting device 24 is disposed at the downstream side of the image forming apparatus 22 in the transport direction of the continuous paper P.

In the exemplary embodiment, in the label paper P2, a portion located around each formed image is cut in an annular shape by the cutting device 24. Accordingly, in the exemplary embodiment, plural labels 6 are produced on the backing paper P1.

That is, in the cutting device 24, an annular cutter (not illustrated) is pressed against the portion located around each image in the label paper P2 to cut the label paper P2, so that the plural labels 6 are aligned on the backing paper P1.

In the exemplary embodiment, the cutting device 24 is provided within the print producing apparatus 20, but the cutting device 24 may be provided at a place different from the print producing apparatus 20. In this case, the roll R is conveyed to the cutting device 24, and the label paper P2 is cut.

The finished roll R (the labels 6) is conveyed to the manufacturing apparatus 10, and is provided in the manufacturing apparatus 10 as indicated by the reference numeral 1A.

Then, the continuous paper P is sequentially fed to a sticking position 12A, so that the labels 6 on the continuous paper P are transported to the sticking position 12A. Then, at the sticking position 12A, the labels 6 peel off from the backing paper P1, and the labels 6 sequentially stick to the products 5 that are transported by the transport device 11.

In the exemplary embodiment, as indicated by the reference numeral 12B, the transport direction of the continuous paper P rapidly changes at the sticking position 12A, and peeling-off of the labels 6 from the backing paper P1 is easily performed at the sticking position 12A.

After the label 6 sticks to the product 5, the product 5 to which the label 6 has stuck (is affixed) (hereinafter, referred to as "the tagged product 5") reaches the inspection device 13, and in the inspection device 13, the tagged product 5 is inspected.

FIG. 2 is a view illustrating inspection items by the inspection device 13.

In the inspection device 13 of the exemplary embodiment, as the inspection item, four inspection items, "label printing," "label processing," "label sticking," and "product," are set, and inspection is performed on each of the four inspection items.

In the "label printing," it is checked whether print contents of the label 6 satisfy predetermined conditions. Specifically, in the "label printing," it is checked whether predetermined conditions are satisfied on each of items such as character loss or blurring, bar code error, color shift or density unevenness, black spot, color spot, streaks, and stains.

In the "label processing," it is checked whether the processing of the label 6 is performed satisfying predetermined conditions.

Specifically, in the "label processing," on each of items such as die-cutting defect, print/removal misalignment, and laminate failure, it is checked whether such a defect is occurring.

In the "label sticking," it is checked whether sticking of the label 6 is performed satisfying predetermined conditions.

Specifically, in the "label sticking," on each of items such as label peeling lifting, and sticking misalignment, it is checked whether a defect is occurring. In the "label sticking," it is checked whether a combination of the product 5 with the label 6 is proper.

In the "product," it is determined whether a defect is occurring in the product itself. Specifically, in the inspection item "product," as to whether, for example, the product 5 is deformed, inspection is performed on each of various inspection items such as a weight of the product 5, and contents of the product 5.

The inspection by the inspection device 13 may be performed by using an existing technique. Specifically, image-capturing on the tagged product 5 may be performed by, for example, a camera such as a CCD, and a processing of matching the result contents of the image-capturing to a previously prepared pattern may be performed so as to determine whether each of the above-described inspection items is satisfied.

Figure 3:
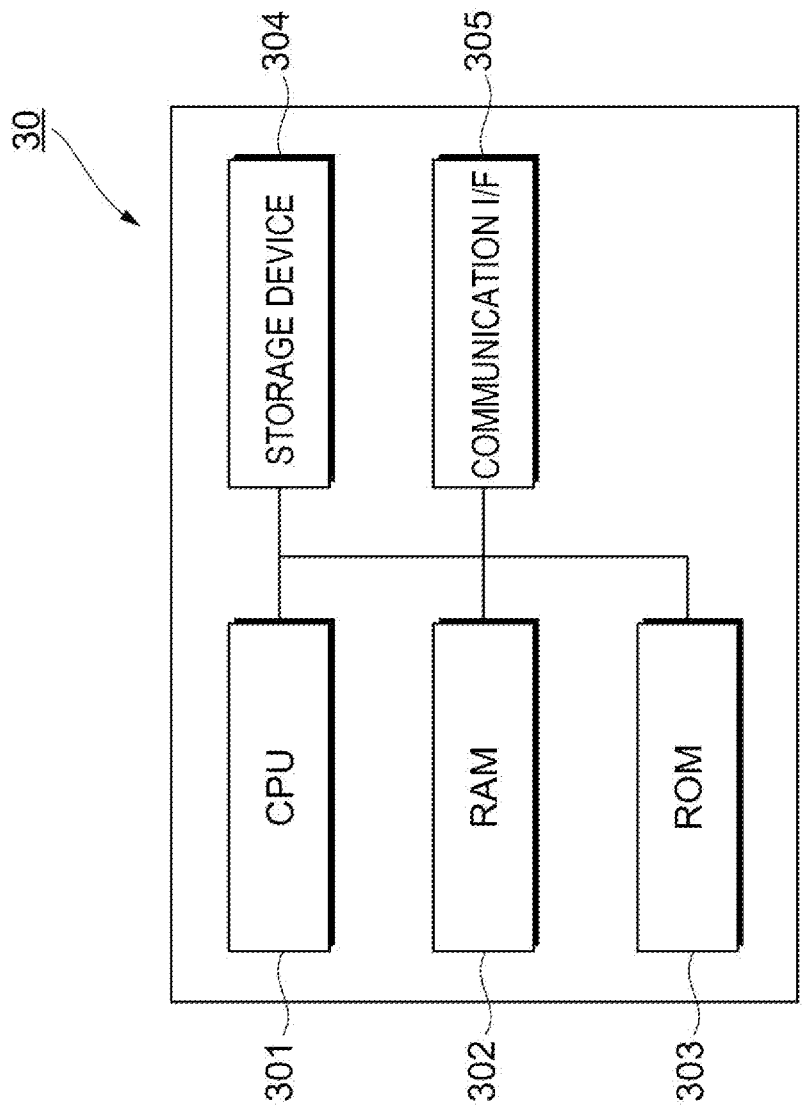
FIG. 3 is a view illustrating a hardware configuration of a management server.

FIG. 3 is a view illustrating a hardware configuration of the management server 30.

The management server 30 as an example of an information processing apparatus is constituted by a computer device, and a central processing unit (CPU) 301, a random access memory (RAM) 302, and a read only memory (ROM) 303 are provided in the management server 30. Also, a storage device 304 constituted by a hard disk device or the like is provided. A communication interface (communication I/F) 305 is provided in the management server 30 to communicate with the outside.

A program to be executed by the CPU 301 may be provided to the management server 30 while being stored in a computer-readable recording medium such as a magnetic recording medium (e.g., a magnetic tape, a magnetic disk), an optical recording medium (e.g., an optical disk), an optical magnetic recording medium, or a semiconductor memory. The program to be executed by the CPU 301 may be downloaded to the management server 30 by using a communication unit such as the Internet.

Figure 4:
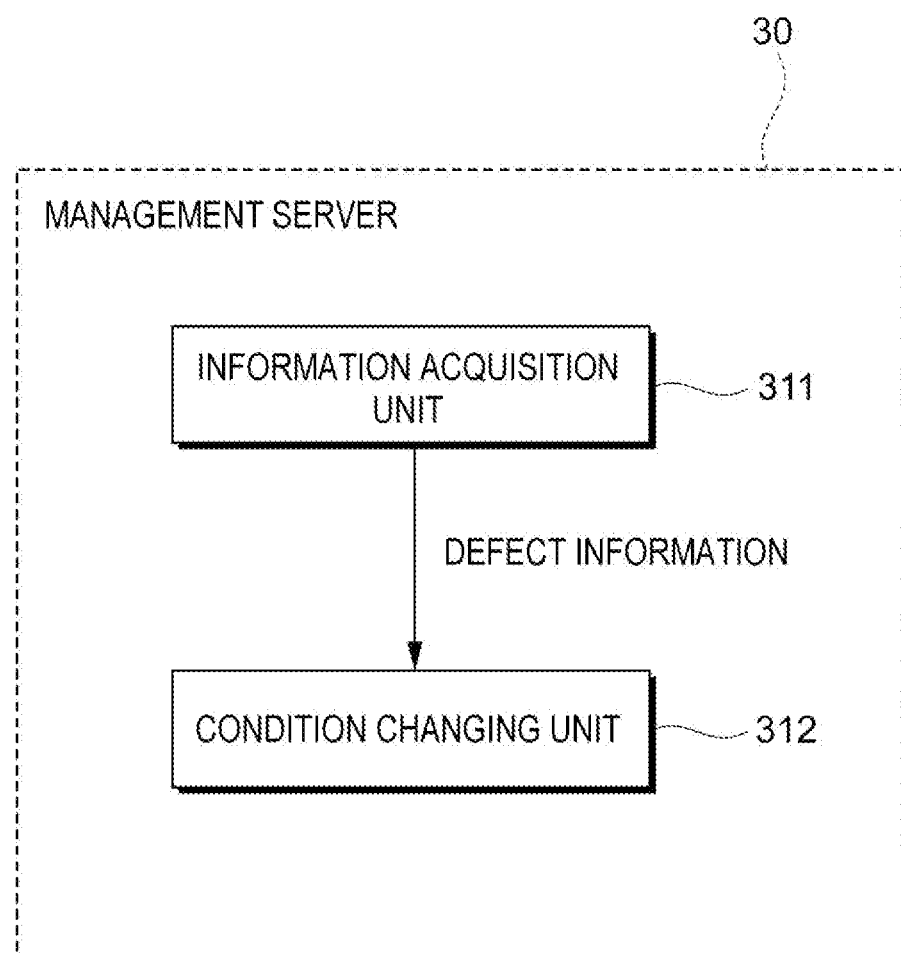
FIG. 4 is a view illustrating functional units realized by a CPU or the like of the management server.

FIG. 4 is a view illustrating functional units realized by the CPU 301 or the like of the management server 30. In FIG. 4, only functional units related to manufacturing of the tagged product 5 are illustrated.

As illustrated in FIG. 4, an information acquisition unit 311 is provided in the management server 30 to acquire defect information. A condition changing unit 312 is provided in the management server 30 to change the conditions of production of the label 6.

The information acquisition unit 311 as an example of an information acquisition unit acquires information from the inspection device 13 (see FIG. 1).

Then, the information acquisition unit 311 analyzes the acquired information, to acquire defect information that is information on a defect of the tagged product 5 manufactured in the manufacturing apparatus 10. Specifically, the information acquisition unit 311 acquires information on the number of the tagged products 5 determined to be defective.

The information acquisition unit 311 acquires information (defect rate information) on a defect rate of the tagged products 5 which are the products 5 to which the labels 6 have stuck.

Specifically, the information acquisition unit 311 acquires defect rate information which is information on the number of defective products relative to the quantity of production of the tagged products 5 (information indicating the ratio of defective products to the quantity of production of the tagged products 5).

That is, the information acquisition unit 311 acquires defect rate information which is information on the number of defective products per unit production quantity of the tagged products 5.

The condition changing unit 312 as an example of a changing unit changes the conditions of production of the label 6 in the print producing apparatus 20 based on the defect information acquired by the information acquisition unit 311.

Specifically, the condition changing unit 312 changes the number of the labels 6 to be produced in the print producing apparatus 20 (the quantity of production per unit time) based on the defect rate information acquired by the information acquisition unit 311.

That is, the condition changing unit 312 changes the quantity of production of the labels 6 to be produced by the print producing apparatus 20 based on the information related to the number of the tagged products 5 determined to be defective.

Figure 5:
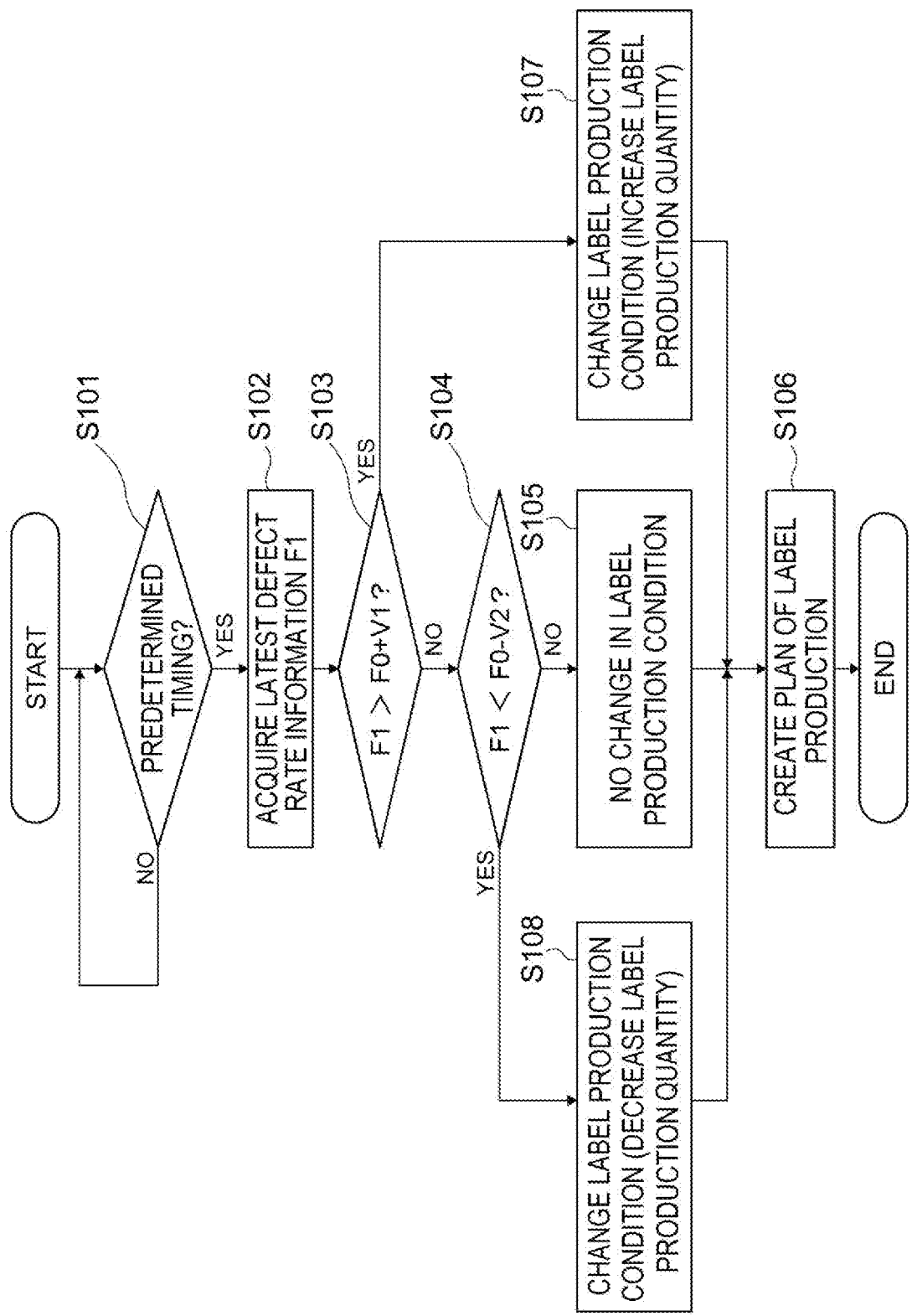
FIG. 5 is a view illustrating a flow of a process performed by the management server.

FIG. 5 is a view illustrating a flow of a process performed by the management server 30.

In the exemplary embodiment, first, the information acquisition unit 311 of the management server 30 determines whether a predetermined timing has come (step 101). That is, the information acquisition unit 311 determines whether a production start timing of the label 6 has come.

More specifically, in the exemplary embodiment, in general, at every predetermined fixed timing, the labels 6 (the roll R) are produced and in step 101, it is determined whether the predetermined timing has come.

Here, whether the predetermined timing has come is determined based on, for example, the number of remaining labels 6 (unused labels 6) in the manufacturing apparatus 10.

Specifically, in the exemplary embodiment, information indicating a manufacturing situation in the manufacturing apparatus 10 (information including a use situation of the labels 6, a defect occurrence situation or the like) is transmitted from the manufacturing apparatus 10 to the management server 30. In the exemplary embodiment, the information acquisition unit 311 acquires the transmitted information.

Then, the information acquisition unit 311 grasps the number of the remaining labels 6 in the manufacturing apparatus 10 based on the acquired information. Then, the information acquisition unit 311 determines that a predetermined timing has come when the grasped number of the remaining labels 6 becomes smaller than a predetermined number of sheets.

Then, when determining that the predetermined timing has come, the information acquisition unit 311 acquires defect rate information (the latest defect rate information F1) of the tagged products 5 based on information acquired from the inspection device 13 (step 102).

More specifically, in step 102, the information acquisition unit 311 acquires a defect rate (the latest defect rate information F1) of the tagged products 5 for a predetermined period retroactive to the past from the present time (at that point in time).

That is, each time the above-described predetermined timing has come, the information acquisition unit 311 acquires a defect rate (the latest defect rate information F1)

of the tagged products 5 for a predetermined period retroactive to the past from the time the predetermined timing has come.

Subsequently, the condition changing unit 312 compares the latest defect rate information F1 acquired in step 102, to the past defect rate information F0 acquired prior to the latest defect rate information F1 by one time period (the past defect rate information F0 at a timing prior to the latest defect rate information F1 by one time period).

That is, the condition changing unit 312 determines whether the defect rate indicated by the latest defect rate information F1 changes as compared to the past.

Specifically, the condition changing unit 312, as described in step 103, determines whether the defect rate specified by the latest defect rate information F1 is larger than a value obtained by adding an additional value V1 (a predetermined threshold value) to the defect rate specified by the past defect rate information F0 (hereinafter, referred to as a "post-addition defect rate").

Then, in step 103, when it is determined that the defect rate specified by the latest defect rate information F1 is not larger than the post-addition defect rate, the process proceeds to step 104. That is, when the degree of a change of a defect rate is small, the process proceeds to step 104.

In the processing in step 104, the condition changing unit 312 determines whether the defect rate specified by the latest defect rate information F1 is smaller than a value obtained by subtracting a predetermined subtraction value V2 (a predetermined threshold value) from the defect rate specified by the past defect rate information F0 (a post-subtraction defect rate).

Then, in step 104, when it is determined that the defect rate specified by the latest defect rate information F1 is not smaller than the post-subtraction defect rate, the condition changing unit 312 does not change the conditions of production of the labels 6 as described in step 105.

Then, in this case, with no change of the conditions of production of the labels 6, a plan of production of the labels 6 is created in the management server 30 (step 106).

In the exemplary embodiment, in this manner, when the degree of a change in the defect rate of the tagged products 5 is small, the conditions of production of the labels 6 is not changed.

In contrast, in step 103, when it is determined that the defect rate specified by the latest defect rate information F1 is larger than the post-addition defect rate, that is, when the defect rate of the tagged products 5 becomes higher than that in the past, the condition changing unit 312 changes the conditions of production of the labels 6 (step 107).

Specifically, the condition changing unit 312 changes the conditions of production of the labels 6 so that the quantity of production of the labels 6 (the quantity of production per unit time) increases. That is, the condition changing unit 312 changes the conditions of production of the labels 6 so that more labels 6 are produced per unit time.

Also, in step 104, when it is determined that the defect rate specified by the latest defect rate information F1 is smaller than the post-subtraction defect rate, that is, when the defect rate of the tagged products 5 becomes lower than that in the past, the condition changing unit 312 changes the conditions of production of the labels 6 (step 108).

Specifically, the condition changing unit 312 changes the production condition of the labels 6 so that the quantity of production of the labels 6 (the production quantity per unit time) decreases. That is, the condition changing unit 312 changes the conditions of production of the labels 6 so that less labels 6 are manufactured per unit time.

In the exemplary embodiment, in the production of the labels 6, the result in the manufacturing of the tagged products 5 which was actually performed in the past (a manufacturing result including information that indicates the extent to which a defect occurred) is referred to, and the conditions of production (production quantity) of the labels 6 to be produced in the future is determined.

Accordingly, in the exemplary embodiment, according to an increase or decrease in the defect rate of the tagged products 5, the quantity of production of the labels 6 increases or decreases.

In the exemplary embodiment, at each predetermined timing, the latest defect rate information F1 is acquired.

Then, in the exemplary embodiment, based on the grasped latest defect rate information F1, the number of labels 6 required in the future is grasped (predicted), and the grasped required number of labels 6 are produced.

That is, in the exemplary embodiment, the manufacturing situation of the tagged products 5 is acquired in real time, and based on the manufacturing situation, the conditions of production (the number of sheets to be produced) of the labels 6 to be produced in the future is determined.

FIGS. 6A and 6B are views illustrating a relationship between the quantity of production of the tagged products 5 and the quantity of production (the number of sheets to be produced) of the labels 6. In FIGS. 6A, and 6B, a triangle indicated by the reference numeral 6W indicates the present time.

FIG. 6A illustrates a relationship between the quantity of production of the tagged products 5 and the quantity of production of the labels 6 in the case where a defect rate of the tagged products 5 is not changed.

In the exemplary embodiment, as indicated by the arrow 6A, a timing at which the labels 6 are produced is different from a timing at which the labels 6 are used by the manufacturing apparatus 10.

Specifically, in the exemplary embodiment, the produced labels 6 are used for manufacturing of the tagged products 5 at a timing later than the point in time of the production.

Specifically, for example, the labels 6 produced at a timing indicated by the reference numeral 6B are used for manufacturing the tagged products 5 at a timing indicated by the reference numeral 6C.

In the exemplary embodiment, based on the defect rate information of the tagged products 5 which have already been manufactured (based on the latest defect rate information F1), the quantity of production of the labels 6 to be produced in the future is determined.

More specifically, in the exemplary embodiment, for example, the quantity of production of the labels 6 to be produced at a timing indicated by the reference numeral 6D is determined based on the defect rate information (the latest defect rate information F1) of the tagged products 5 manufactured at a timing indicated by the reference numeral 6X, and the defect rate information (the past defect rate information F0) of the tagged products 5 manufactured at a timing (not illustrated) prior to the timing indicated by the reference numeral 6X by one time period.

Here, the processing example illustrated in FIG. 6A describes the case where the defect rate of the tagged products 5 manufactured at the timing indicated by the reference numeral 6X (the defect rate specified by the latest defect rate information F1) is not changed with respect to the defect rate of the tagged products 5 manufactured at the timing (not illustrated) ahead by one time period (the defect rate specified by the past defect rate information F0).

In this case, the number of the labels 6 to be produced in the future (the labels 6 to be produced at the timing indicated by the reference numeral 6D) becomes the same as the number of the labels 6 produced at a timing ahead by one time period (at the timing indicated by the reference numeral 6B). That is, in this case, the quantity of production of the labels 6 is not changed.

FIG. 6B is a view illustrating a relationship between the quantity of production of the tagged products 5 and the quantity of production of the labels 6 in the case where a defect rate of the tagged products 5 increases.

This processing example describes the case where many defects occur in the manufacturing of the tagged products 5 at a timing indicated by the reference numeral 6G, and the defect rate of the tagged products 5 (the latest defect rate information F1) increases at the timing indicated by the reference numeral 6G.

In this case, in the subsequent manufacturing of the tagged products 5 (in the manufacturing of the tagged products 5 at a timing indicated by the reference numeral 6H and subsequent timings), in order to satisfy a predetermined scheduled production quantity, more tagged products 5 are manufactured than that before the defect rate has increased.

That is, in the case where the defect rate increases, when the same number of tagged products 5 as before are still continuously manufactured, the predetermined scheduled production quantity may not be satisfied.

Thus, in the exemplary embodiment, when the defect rate (the defect rate specified by the latest defect rate information F1) increases, an occurrence of more defective products is predicted, and the quantity of production of the tagged products 5 is increased. That is, the quantity of production of the tagged products 5 per unit time is increased.

In the exemplary embodiment, at a timing indicated by the reference numeral 6J and each of subsequent timings, the quantity of production of the labels 6 is also increased. That is, in the print producing apparatus 20, the quantity of production of the labels 6 per unit time is changed, and the quantity of production of the labels 6 per unit time is increased.

Here, in this processing example, for example, it is assumed that at a timing (not illustrated) prior to the timing indicated by the reference numeral 6G by one time period, the defect rate of the tagged products 5 (the defect rate specified by the past defect rate information F0) is 5%. Also, it is assumed that a scheduled production quantity of the tagged products 5 is 1000.

In this case, at the timing indicated by the reference numeral 6G, the quantity of production of the tagged products 5 (hereinafter, referred to as an "actual production quantity") becomes 1052. At a timing indicated by the reference numeral 6Z, the quantity of production of the labels 6 (hereinafter, referred to as an "actual production quantity") becomes 1052.

Accordingly, even when a defect of 5% occurs at the timing indicated by the reference numeral 6G in the manufacturing of the tagged products 5, 1000 tagged products 5 corresponding to the originally scheduled production quantity are manufactured, and the labels 6 are consumed without excess or deficiency.

Here, in this processing example, it is assumed that at the timing indicated by the reference numeral 6G, the defect rate increases in the actual manufacturing of the tagged products 5, and the latest defect rate F1 becomes 10% (a case where the defect rate increases by 5%).

In this case, in the subsequent manufacturing of the tagged products 5 (in the manufacturing of the tagged products 5 at the timing indicated by the reference numeral 6H and subsequent timings), it is assumed that the actual production quantity of the tagged products 5 is 1111. In the production of the labels 6 (in the production of the labels 6 at the timing indicated by the reference numeral 6J and subsequent timings), it is assumed that the actual production quantity of the labels 6 is 1111.

Accordingly, in this case as well, in the subsequent structuring of the tagged products 5, even when a defect of 10% occurs in the tagged products 5, 1000 tagged products 5 corresponding to the originally scheduled production quantity are manufactured, and the labels 6 are consumed without excess or deficiency.

That is, in this processing example, when the defect rate specified by the grasped latest defect rate information F1 increases, in the following manufacturing of the tagged products 5, and in the following production of the labels 6, the quantity of production of the tagged products 5 and the quantity of production of the labels 6 are increased according to the increase in the defect rate.

Here, for example, in order to cope with the increase in the defect rate of the tagged products 5 (in order to cope with the increase in the actual production quantity of the tagged products 5), for example, previous production and storage of the labels 6 are also taken into consideration. However, in this case, a stock of the labels 6 occurs, and a cost for a stock management is likely to occur. In particular, when the manufacturing scale of the tagged products 5 is large, the cost for the stock management increases.

In contrast, in the exemplary embodiment, it is possible to reduce the labels 6 which are produced in advance and stored, and a cost for the stock management hardly occurs.

Figure 7:
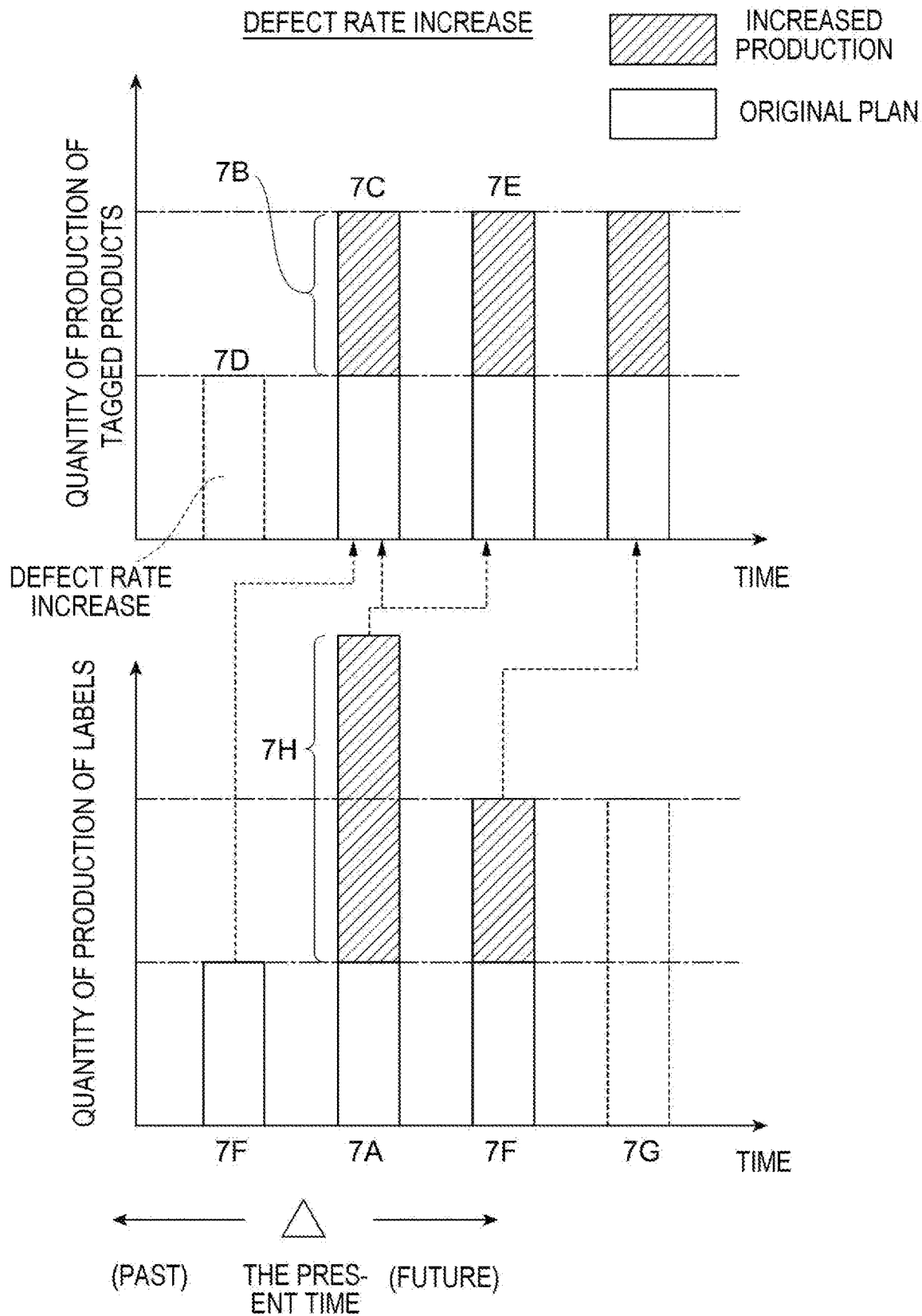
FIG. 7 is a view illustrating another processing example in the case where a defect rate of the tagged products increases.

FIG. 7 is a view illustrating another processing example in the case where a defect rate of the tagged products 5 increases.

In the processing example illustrated in FIG. 7, as compared to the processing example illustrated in FIG. 6B, a delay in the manufacturing of the tagged products 5 hardly occurs.

Here, in the processing example illustrated in FIG. 6B, it is required to temporarily stop the manufacturing of the tagged products 5 at each timing when the tagged products 5 are manufactured, and a delay in the manufacturing of the tagged products 5 is likely to occur.

Specifically, in the processing example illustrated in FIG. 6B, at the timing indicated by the reference numeral 6H, when the quantity of production of the tagged products 5 reaches a position indicated by the reference numeral 6Y, a lack of the labels 6 is caused, and then the manufacturing of the tagged products 5 is temporarily stopped.

Specifically, in the manufacturing of the tagged products 5 up to the position indicated by the reference numeral 6Y, the labels 6 produced at the timing indicated by the reference numeral 6Z may be supplied. However, when these labels 6 are consumed, it is required to wait for the production of the labels 6 at the timing indicated by the reference numeral 6J, and thus, the manufacturing of the tagged products 5 is temporarily stopped.

Also, afterwards, likewise, for example, at a timing indicated by the reference numeral 6K, in the manufacturing of the tagged products 5, when the quantity of production of the tagged products 5 reaches a position indicated by the reference numeral 6L, a lack of the labels 6 is caused, and then the manufacturing of the tagged products 5 is temporarily stopped.

Specifically, at the timing indicated by the reference numeral 6K, in the manufacturing of the tagged products 5, first, among the labels 6 produced at the timing indicated by the reference numeral 6J, the labels 6 of a portion indicated by the reference numeral 6M are supplied. Then, when these labels 6 are consumed, it is required to wait for manufacturing of the labels 6 at a timing indicated by the reference numeral 6P, and thus, the manufacturing of the tagged products 5 is temporarily stopped.

In contrast, in the processing example illustrated in FIG. 7, in the production of the labels 6 performed at a timing subsequently to an increase in the defect rate (in the production of the labels 6 at a timing indicated by the reference numeral 7A), the quantity of production of the labels 6 is made larger than the quantity of production of the labels 6 in the processing example illustrated in FIG. 6B.

That is, in the processing example illustrated in FIG. 7, the quantity of production of the labels 6 per unit time at a specific timing (the timing indicated by the reference numeral 7A) is made larger than the quantity of production of the labels 6 per unit time at another timing (a timing indicated by the reference numeral 7F).

In the production of the labels 6 at the timing indicated by the reference numeral 7A, the number of the labels 6 additionally produced due to the increase in the defect rate (the number of the labels 6 in a portion indicated by the reference numeral 7H) is made larger than the number of the tagged products 5 additionally manufactured due to the increase in the defect rate (the number of the tagged products 5 corresponding to the increased production) (the quantity of production of the tagged products 5 in a portion indicated by the reference numeral 7B).

That is, in the exemplary embodiment, when the defect rate of the tagged products 5 increases, accordingly, at the following timing, the tagged products 5 are increased in production (see the portion of the reference numeral 7B).

In this case, in this processing example illustrated in FIG. 7, at a timing subsequently to the increase in the defect rate, in the production of the labels 6 (in the production of the labels 6 at the timing indicated by the reference numeral 7A), the number of the labels 6 corresponding to an increase in production (the quantity of production of the labels 6 in the portion indicated by the reference numeral 7H) is made larger than the number of the tagged products 5 corresponding to an increase in production (the quantity of production of the tagged products 5 in the portion indicated by the reference numeral 7B).

More specifically, as described above, when the defect rate of the tagged products 5 is changed to 10% from 5% (when the defect rate specified by the latest defect rate information F1 becomes 10%), at a timing indicated by the reference numeral 7C, 59 (=1111−1052) more tagged products 5 are produced as compared to that at a timing ahead by one time period as indicated by the reference numeral 7D.

In this case, in the production of the labels 6 at the timing indicated by the reference numeral 7A, the number of the labels 6 corresponding to an increase in production is made larger than 59.

In the processing example illustrated in FIG. 7, at the first timing that comes after the defect rate increases (the timing indicated by the reference numeral 7A), the labels 6 corresponding to a shortage occurring in the subsequent manufacturing of the tagged products 5 are additionally produced.

That is, in the processing example illustrated in FIG. 7, the quantity of production of the labels 6 per unit time at the timing that firstly comes after the defect rate increases (the timing indicated by the reference numeral 7A) is made larger than the quantity of production of the labels 6 per unit time at the subsequent timing (e.g., the timing indicated by the reference numeral 7F) so that the labels 6 corresponding to a shortage occurring in the subsequent manufacturing of the tagged products 5 are additionally produced.

Here, in the processing example illustrated in FIG. 6B, at the timing indicated by the reference numeral 6K, in the manufacturing of the tagged products 5, the labels 6 corresponding to the number of the tagged products 5 indicated by the reference numeral 6Q become temporarily insufficient. In the processing example illustrated in FIG. 7, at the timing indicated by the reference numeral 7A, the labels 6 corresponding to this shortage are additionally produced.

As described above, when the labels 6 corresponding to the shortage are additionally produced, at a timing indicated by the reference numeral 7E and subsequent timings, it becomes possible to manufacture the tagged products 5 without waiting for new production of the labels 6.

That is, it is possible to manufacture the tagged products 5 without stopping the manufacturing of the tagged products 5 due to the lack of the labels 6.

In the exemplary embodiment, when the defect rate of the tagged products 5 increases, and the quantity of production of the tagged products 5 increases, the quantity of production of the labels 6 having been produced at that point in time was determined based on a low defect rate.

In this case, a state where the labels 6 are insufficient occurs. Then, in this state, when the tagged products 5 are continuously manufactured, at each timing when the tagged products 5 are manufactured, a situation arises in which the manufacturing of the tagged products 5 is temporarily stopped.

In contrast, as illustrated in FIG. 7, at the timing when the labels 6 are produced, when the labels 6 are produced exceeding an originally scheduled production quantity of the labels 6 (the scheduled production quantity calculated only based on the defect rate information of the tagged products 5), the shortage of the labels 6 is compensated.

Then, in this case, at a timing after the compensation is made, the manufacturing of the tagged products 5 is not temporarily stopped.

The timing at which the labels 6 corresponding to the shortage are produced may be any timing after the defect rate of the tagged products 5 increases, but it is desirable to produce the labels 6 corresponding to the shortage at a timing that firstly comes after the defect rate increases.

In this case, as compared to the case where the labels 6 corresponding to the shortage are produced at a timing later than a timing that firstly comes, the manufacturing of the tagged products 5 will not be stopped at an earlier timing.

A specific example will be described.

As described above, when the defect rate is changed from 5% to 10%, in the processing example illustrated in FIG. 7, at the timing indicated by the reference numeral 7A, 1170 (1111+59) labels 6 are produced.

When the defect rate of the tagged products 5 is changed from 5% to 10%, the number of the produced tagged products 5 (an actual production quantity) is 1111 and the number of the produced labels 6 is 1152 at the timing indicated by the reference numeral 7F. This causes a lack of 59 labels 6.

Accordingly, in the production of the labels 6 at the timing indicated by the reference numeral 7A, besides the originally scheduled production quantity (1111), 59 labels 6 are further produced. In total, 1170 labels 6 are produced.

That is, in the production of the labels 6 at the timing indicated by the reference numeral 7A, the number of the labels 6 to be produced is set to 1170 which is obtained by adding the originally scheduled production quantity (1111) to 59 sheets corresponding to the shortage of the labels 6.

Accordingly, at the timing indicated by the reference numeral 7E and subsequent timings, in the manufacturing of the tagged products 5, the manufacturing of the tagged products 5 is not stopped halfway.

That is, in the exemplary embodiment, when the defect rate of the tagged products 5 increases, the production of the tagged products 5 are increased, and the tagged products 5 are produced in a quantity that is larger by the increase in production than that before the defect rate increases.

In this case, in the exemplary embodiment, at the timing indicated by the reference numeral 7A (an example of the specific timing), the quantity of production of the labels 6 per unit time is increased by the number corresponding to the increase in production.

More specifically, at the timing indicated by the reference numeral 7A, the quantity of production of the labels 6 per unit time is increased by the number corresponding to the increase in production, relative to the quantity of production of the labels 6 per unit time at another timing indicated by the reference numeral 7F.

Figure 8:
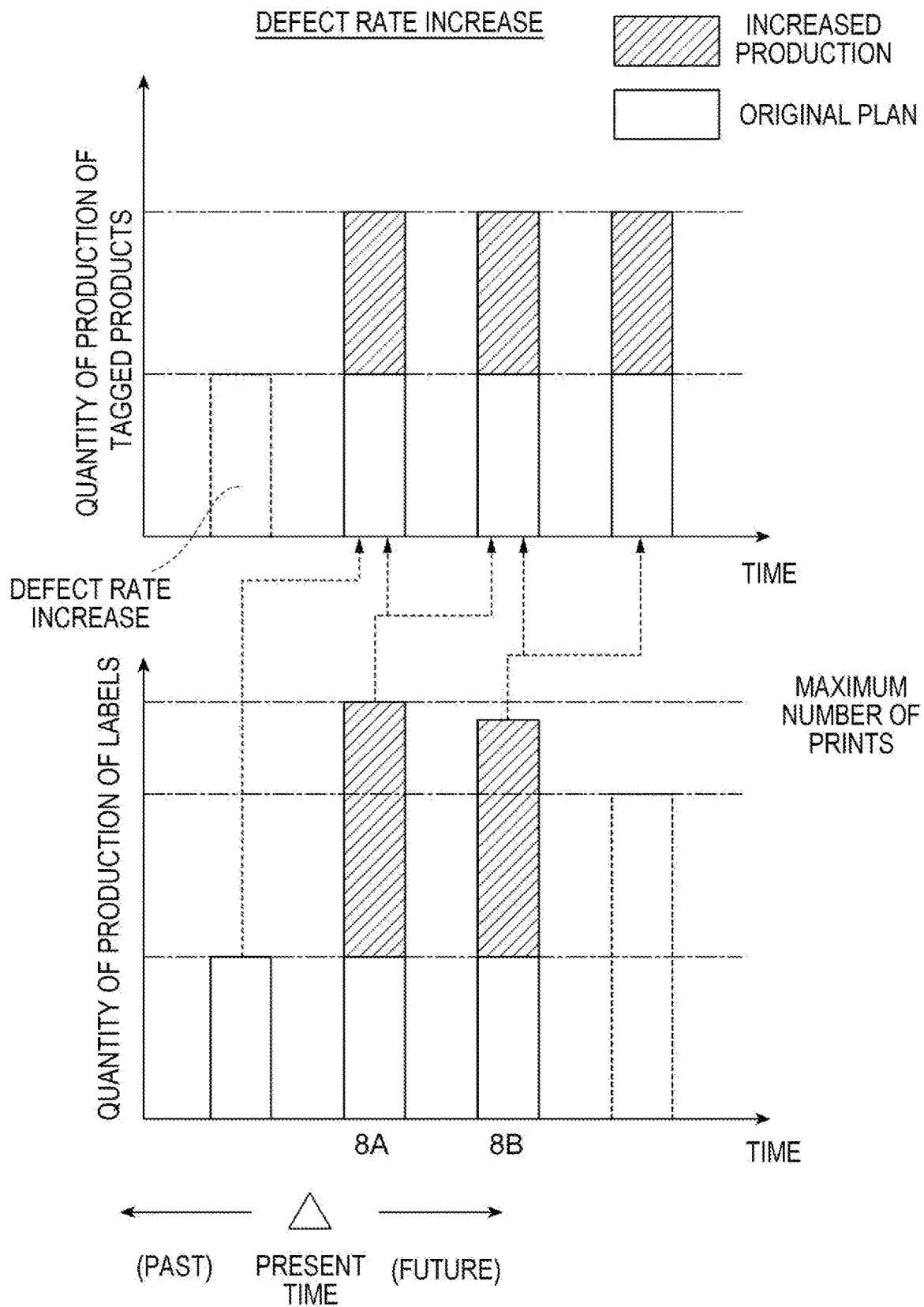
FIG. 8 is a view illustrating another processing example related to manufacturing of the tagged products and production of the labels.

When production of all the labels 6 corresponding to the shortage may not be performed at one timing, as illustrated in FIG. 8 (which is a view illustrating another processing example on manufacturing of the tagged products 5 and production of the labels 6), the production corresponding to the shortage may be performed plural times.

Specifically, in the processing example illustrated in FIG. 8, the labels 6 corresponding to the shortage are produced at each of two timings, that is, a timing indicated by the reference numeral 8A, and a timing indicated by the reference numeral 8B.

That is, FIG. 8 illustrates a case where not all labels 6 in the quantity corresponding to the increase in production are able to be produced at one timing (one specific timing).

In this case, some of the labels 6 in the quantity corresponding to the increase in production are also produced at the timing indicated by the reference numeral 8B (another timing different from one timing as described above).

Here, for example, the number of the labels 6 held in the roll R is limited, and not all the labels 6 in the quantity corresponding the increase in production (all the labels 6 corresponding to the shortage) can be held in one roll R.

Therefore, in such a case, as illustrated in FIG. 8, the production of the labels 6 corresponding to the shortage is performed plural times. When each of the plural rolls R is manufactured, the labels 6 corresponding to the shortage are produced.

In this case, until all the labels 6 corresponding to the shortage are produced, the above-described temporary stop of manufacturing occurs. However, once all the labels 6 corresponding to the shortage are produced, thereafter, the temporary stop of manufacturing does not occur.

Figure 9:
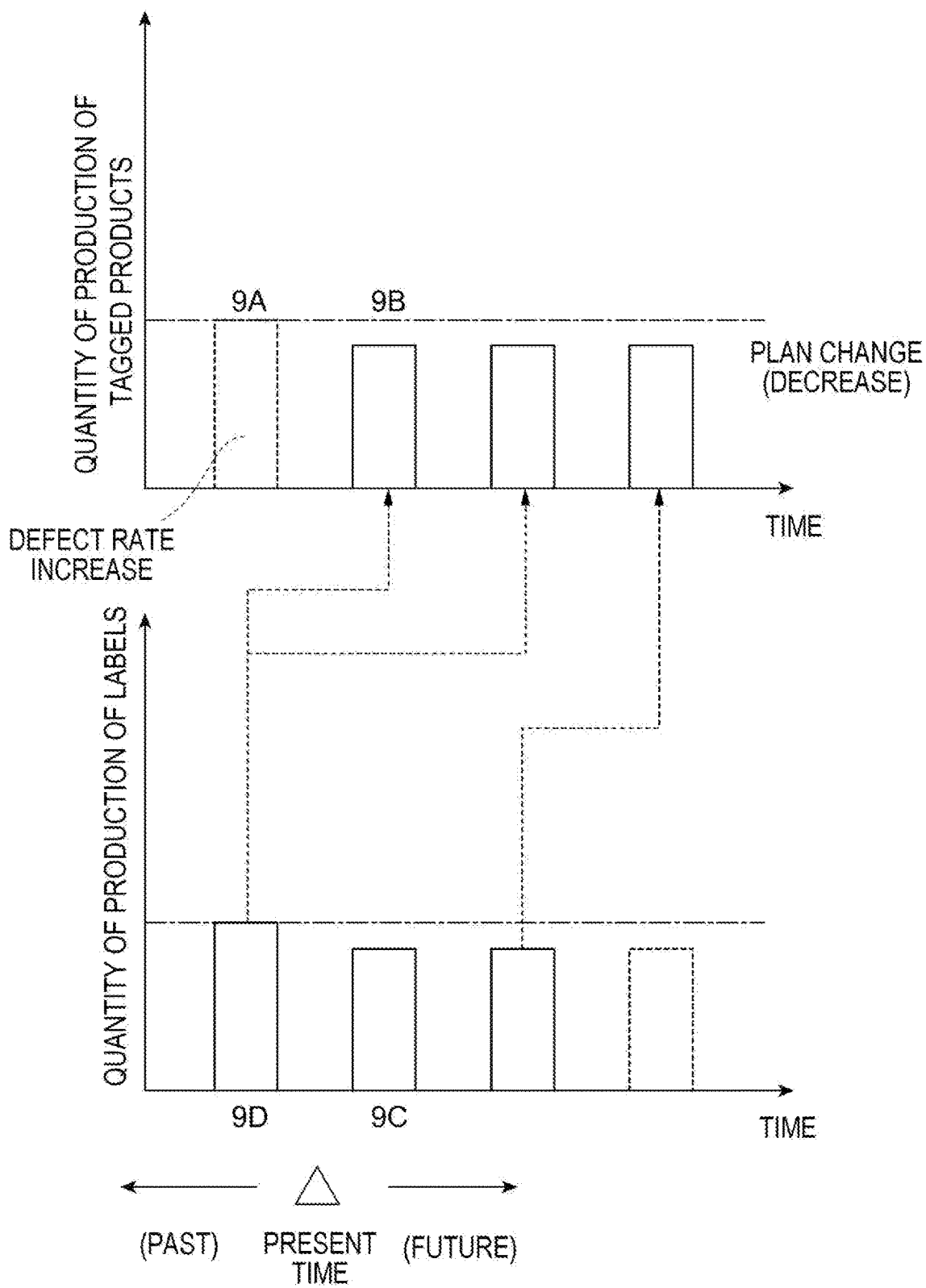
FIG. 9 is a view illustrating a relationship between the quantity of production of the tagged products and the quantity of production of the labels in the case where a defect rate of the tagged products decreases.

FIG. 9 is a view illustrating a relationship between the quantity of production of the tagged products 5 and the quantity of production of the labels 6 in the case where a defect rate of the tagged products 5 decreases.

This example illustrates a case where in the manufacturing of the tagged products 5 at a timing indicated by the reference numeral 9A, the defect rate of the tagged products 5 decreases.

In this case, in order to suppress surplus manufacturing of the tagged products 5, in the subsequent manufacturing of the tagged products 5 (in the manufacturing of the tagged products 5 at a timing indicated by the reference numeral 9B and subsequent timings), the quantity of production of the tagged products 5 per unit time is reduced.

That is, in the case where the defect rate of the tagged products 5 decreases, when the quantity of production of the tagged products 5 per unit time is set to the same production quantity as before the decrease of the defect rate, the tagged products 5 are manufactured exceeding a predetermined scheduled production quantity.

Thus, in this processing example, when the defect rate of the tagged products 5 decreases, the quantity of production of the tagged products 5 is decreased.

In this processing example, when the defect rate of the tagged products 5 decreases, the quantity of production of the labels 6 is also decreased. Specifically, at a timing indicated by the reference numeral 9C and subsequent timings, the quantity of production of the labels 6 per unit time is decreased.

That is, this processing example describes a case where the defect rate specified by the latest defect rate information F1 decreases. In this case, the conditions of production of the labels 6 is changed so that the quantity of production of the labels 6 per unit time in the print producing apparatus 20 (the quantity of production per unit time) is decreased.

Here, a mode in which without a reduction of the quantity of production of the labels 6, a fixed number of labels 6 are always produced at each timing may also be taken into consideration. However, in this case, as described above, when the defect rate of the tagged products 5 decreases, the labels 6 remain. Then, in this case, a stock of the labels 6 occurs, and a cost for a stock management occurs.

In contrast, as described above, when the quantity of production of the labels 6 is decreased according to the decrease of the defect rate of the tagged products 5, as compared to a case where the fixed number of labels 6 are produced as described above, the stock of the labels 6 decreases, and the cost for the stock management hardly occurs.

Figure 10:
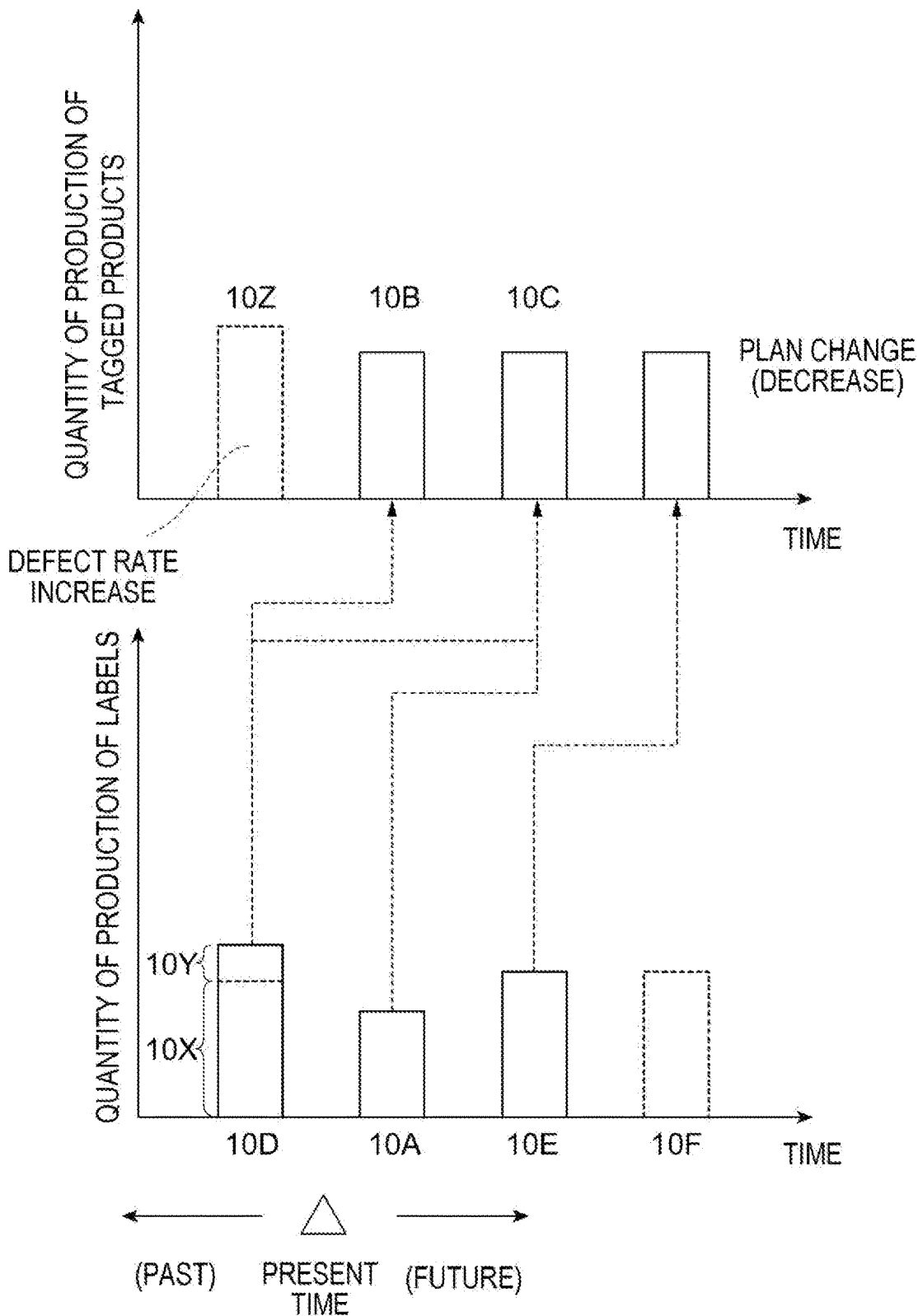
FIG. 10 is a view illustrating another processing example in the case where a defect rate of the tagged products decreases.

FIG. 10 is a view illustrating another processing example in the case where the defect rate of the tagged products 5 decreases.

In this processing example illustrated in FIG. 10, as compared to the processing example illustrated in FIG. 9, a stock of the labels 6 is more unlikely to occur.

Here, in the processing example illustrated in FIG. 9, when the tagged products 5 are manufactured at the timing indicated by the reference numeral 9B, not all the labels 6 produced at a timing indicated by the reference numeral 9D are used, and the labels 6 remain.

That is, the labels 6 produced at the timing indicated by the reference numeral 9D are labels 6 produced based on a high defect rate, and the quantity of production thereof is large.

Thus, in this case, when the defect rate of the tagged products 5 decreases, and the quantity of production of the tagged products 5 decreases, the labels 6 remain. Then, in this case, due to the remaining labels 6, the cost for the stock management occurs.

In contrast, in the processing example illustrated in FIG. 10, in the production of the labels 6 performed at a timing (a timing indicated by the reference numeral 10A) subsequently to the decrease of the defect rate of the tagged products 5, the number of the labels 6 corresponding to a decrease in production is larger than the number of the tagged products 5 corresponding to a decrease in production.

That is, at a timing of production of the labels 6 which firstly comes after the decrease of the defect rate of the tagged products 5, the quantity of production of the labels 6 is made smaller than the quantity of production of the tagged products 5 at a timing indicated by the reference numeral 10B (a timing which firstly comes after the decrease of the defect rate).

In this processing example, the quantity of production of the labels 6 per unit time at a specific timing (in this example, the timing indicated by the reference numeral 10A) is made smaller than the quantity of production of the labels 6 per unit time at another timing (e.g., a timing indicated by the reference numeral 10E).

More specifically, in the processing example illustrated in FIG. 10, the quantity of production of the labels 6 per unit time at the timing indicated by the reference numeral 10A, that is, the specific timing that firstly comes after the decrease of the defect rate, is made smaller than the quantity of production of the labels 6 per unit time at the timing indicated by the reference numeral 10E, that is, a later timing.

In further description, in the production of the labels 6 at the timing indicated by the reference numeral 10A, the labels 6 corresponding to the number obtained by subtracting the number of the labels 6 to remain as a stock, from originally scheduled production quantity of the labels 6, are produced.

Specifically, in the production of the labels 6 at the timing indicated by the reference numeral 10A, the labels 6 corresponding to the number obtained by subtracting the number of the labels 6 to remain in the manufacturing of the tagged products 5 at the timing indicated by the reference numeral 10B, from the originally scheduled production quantity of the labels 6, are produced.

More specifically, in the production of the labels 6 at the timing indicated by the reference numeral 10A, the labels 6 are originally produced in corresponding quantity corresponding to the quantity of production of the tagged products 5 after a production decrease. Meanwhile, in this processing example, the labels 6 corresponding to a number obtained by subtracting the number of the labels 6 to remain, from the corresponding quantity, are produced.

In this processing, at a timing indicated by the reference numeral 10C, in the manufacturing of the tagged products 5, the labels 6 which remain in the manufacturing of the tagged products 5 at the timing indicated by the reference numeral 10B are supplied.

More specifically, in this processing example, among the labels 6 produced at a timing indicated by the reference numeral 10D, a portion indicated by the reference numeral 10X is supplied to the manufacturing of the tagged products 5 at the timing indicated by the reference numeral 10B, and then the labels 6 in a portion indicated by the reference numeral 10Y remain.

Then, in this processing example, the remaining labels 6 are supplied to the manufacturing of the tagged products 5 at the timing indicated by the reference numeral 10C.

In this processing example, at the timing indicated by the reference numeral 10A, in the production of the labels 6, the number corresponding to the remaining labels 6 is subtracted from an originally scheduled production quantity (the scheduled production quantity calculated only based on the latest defect rate information F1).

As in the exemplary embodiment, when the defect rate of the tagged products 5 decreases, the tagged products 5 are decreased in production, and the tagged products 5 are manufactured in a quantity smaller than that before the defect rate decreases, by the decreased production.

In the processing example illustrated in FIG. 10, at the timing indicated by the reference numeral 10A (an example of the specific timing), the quantity of production of the labels 6 per unit time is decreased by the decreased production.

More specifically, at the timing indicated by the reference numeral 10A, in the production of the labels 6, the quantity of production of the labels 6 is decreased by the decreased production, as compared to the quantity of production of the labels 6 per unit time at another timing, that is, the timing indicated by the reference numeral 10E.

Accordingly, in this processing example, the remaining labels 6 are consumed, and in the subsequent production of the labels 6, surplus labels 6 do not occur.

When the labels 6 are decreased in production, it is desirable to decrease a production of the labels 6 by the number corresponding to all the sheets of the labels 6 to remain, but it is possible to decrease a production by a quantity smaller than the number corresponding to all the sheets instead of the number corresponding to all the sheets.

In this case as well, as compared to the case where the labels 6 are not decreased in production at all, a stock of the labels 6 is decreased and a cost for a stock management is reduced.

Here, it is desirable to decrease the production of the labels 6 at an earlier timing, that is, at a timing of production of the labels 6 which firstly comes after the defect rate of the tagged products 5 decreases (e.g., the timing indicated by the reference numeral 10A).

Until the labels 6 are decreased in production, the same number of labels 6 as the remaining labels 6 are always present in the stock. When the production decrease of the labels 6 is performed at an earlier timing, the stock is decreased at an earlier timing, and the cost for the stock management does not occur at an earlier timing.

A specific example will be described.

First, in the manufacturing of the tagged products 5 at a timing indicated by the reference numeral 10Z, it was assumed that in an original plan, the defect rate of the tagged products 5 is 10%.

Then, at the timing indicated by the reference numeral 10Z, in order to manufacture 1000 tagged products 5, 1111 tagged products 5 were manufactured. Then, at the timing indicated by the reference numeral 10D, 1111 labels 6 were produced.

However, at the timing indicated by the reference numeral 10Z, in the actual manufacturing of the tagged products 5, the defect rate becomes smaller than the assumed defect rate, and becomes 5%.

In this case, at the following timing (the timing indicated by the reference numeral 10B), the quantity of production of the tagged products 5 becomes 1052. Then, at the timing indicated by the reference numeral 10E, the quantity of production of the labels 6 becomes 1052.

Accordingly, in the subsequent manufacturing of the tagged products 5, the scheduled number (1000) of tagged products 5 may be manufactured.

Meanwhile, at the timing indicated by the reference numeral 10A (the specific timing, a timing that firstly comes after the defect rate decreases), the quantity of production of the labels 6 is set to 993(=(1052−(1111−1052)) instead of 1052.

Here, at the timing indicated by the reference numeral 10B, in the manufacturing of the tagged products 5, the quantity of production of the tagged products 5 becomes 1052.

In this case, even when 1111 labels 6 are prepared, only 1052 labels 6 are used in the manufacturing of the tagged products 5 at the timing indicated by the reference numeral 10B, and thus 59 labels 6 remain.

Therefore, in the production of the labels 6 at the timing indicated by the reference numeral 10A, 993 which is obtained by subtracting 59 from the originally scheduled number (1052) is finally set to the quantity of production of the labels 6.

Accordingly, in the manufacturing of the tagged products 5 at the timing indicated by the reference numeral 10C, all the remaining labels 6 are consumed, and the stock of the labels 6 is lost.

In the processing example illustrated in FIG. 10, descriptions are made on an example of a case where the labels 6 are decreased in production, but without subtraction of the labels 6, the quantity of production of the labels 6 may be set to zero. That is, the production of the labels 6 may not be performed at all.

For example, at the timing indicated by the reference numeral 10Z, in the manufacturing of the tagged products 5, the defect rate may largely decrease, and then many labels 6 may remain.

In this case, at the timing indicated by the reference numeral 10B, and at the timing indicated by the reference numeral 10C, when the remaining labels 6 may be supplied to the manufacturing of the tagged products 5, the quantity of production of the labels 6 at the timing indicated by the reference numeral 10A (an example of the specific timing) is set to zero.

Accordingly, all the remaining labels 6 are consumed, and in this case as well, the stock of the labels 6 is lost.

In the same manner as above, it is desirable to set a timing when the quantity of production of the labels 6 is set to zero, to a timing of production of the labels 6 which firstly comes after the defect rate of the tagged products 5 decreases.

In the case where a large number of labels 6 remain, even when the quantity of production of the labels 6 is set to zero at one timing, all the remaining labels 6 may not be consumed.

In this case, for example, the stock of the labels 6 may also be consumed by setting the quantity of production of the labels 6 to zero or decreasing the production of the labels 6 at a second timing and a subsequent timing.

FIGS. 11A and 11B are views schematically illustrating the contents of the processing examples illustrated in FIGS. 6A and 6B and FIGS. 7 to 10;

FIG. 11A is a view schematically illustrating the contents of the processings illustrated in FIGS. 6A and 6B and FIGS. 7 and 8.

FIG. 11A illustrates a case where the defect rate of the tagged products 5 increases. In this case, as indicated by the arrow 11A, the actual production quantity of the tagged products 5 increases. When the defect rate of the tagged products 5 increases, accordingly, the actual production quantity of the labels 6 also increases.

When the defect rate of the tagged products 5 increases, as indicated by the arrow 11B, immediately after the defect rate increases, the labels 6 are temporarily increased in production, and the labels 6 corresponding to a shortage are produced.

FIG. 11B illustrates a case where the defect rate of the tagged products 5 decreases. In this case, as indicated by the arrow 11C, the actual production quantity of the tagged products 5 decreases. When the defect rate of the tagged products 5 decreases, accordingly, the actual production quantity of the labels 6 also decreases.

When the defect rate of the tagged products 5 decreases, as indicated by the arrow 11D, immediately after the defect rate decreases, a production decrease rate of the labels 6 is made large, and the labels 6 to remain as a stock are consumed.

(Others) the above-descriptions have been made on an example of a case in which the quantity of production of the labels 6 increases and decreases according to an increase or a decrease of the defect rate of the tagged products 5. Meanwhile, the quantity of production of the labels 6 may be increased or decreased due to another factor instead of an increase or a decrease of the defect rate of the tagged products 5.

Specifically, for example, when the information acquisition unit 311 acquires a plan of production of the tagged products 5, according to the production plan in which the quantity of production of the tagged products 5 (the quantity of production per unit time) is increased or decreased, the quantity of production of the labels 6 may be increased or decreased as described above.

Specifically, for example, in the case where the quantity of production of the tagged products 5 increases according to an increase in demand, when the quantity of production of the labels 6 is increased in the same manner as above, it is possible to suppress a cost for stock management of the labels 6, while supplying the labels 6 with less excess or deficiency.

More specifically, for example, in the case where the acquired production plan is a production plan in which the quantity of production of the tagged products 5 per unit time is increased, when the quantity of production of the labels 6 per unit time is increased in the print producing apparatus 20, it is possible to suppress a cost for stock management of the labels 6 while supplying the labels 6 with less excess or deficiency.

In the same manner as above, in the production at a specific timing, the labels 6 may be additionally produced in the same quantity as the increase in the production of the tagged products 5, so that the manufacture of the tagged products 5 is less likely to stop due to lack of the labels 6.

For example, in the case where the quantity of production of the tagged products 5 decreases according to a decrease in demand, when the quantity of production of the labels 6 is decreased in the same manner as above, it is possible to suppress an increase in cost due to surplus production of the labels 6 (an increase in cost due to a stock management of the labels 6).

More specifically, in the case where the acquired production plan is a production plan in which the quantity of production of the tagged products 5 per unit time is decreased, when the quantity of production of the labels 6 per unit time is decreased in the print producing apparatus 20, it is possible to suppress an increase in the cost of a stock management due to surplus production of the labels 6.

In the same manner as above, at a certain specific timing, a larger number of labels 6 are further decreased in production than the number of the tagged products 5 corresponding to a decrease in production, it is possible reduce the stock of excessively produced labels 6, and to further reduce a cost.

Figure 12:
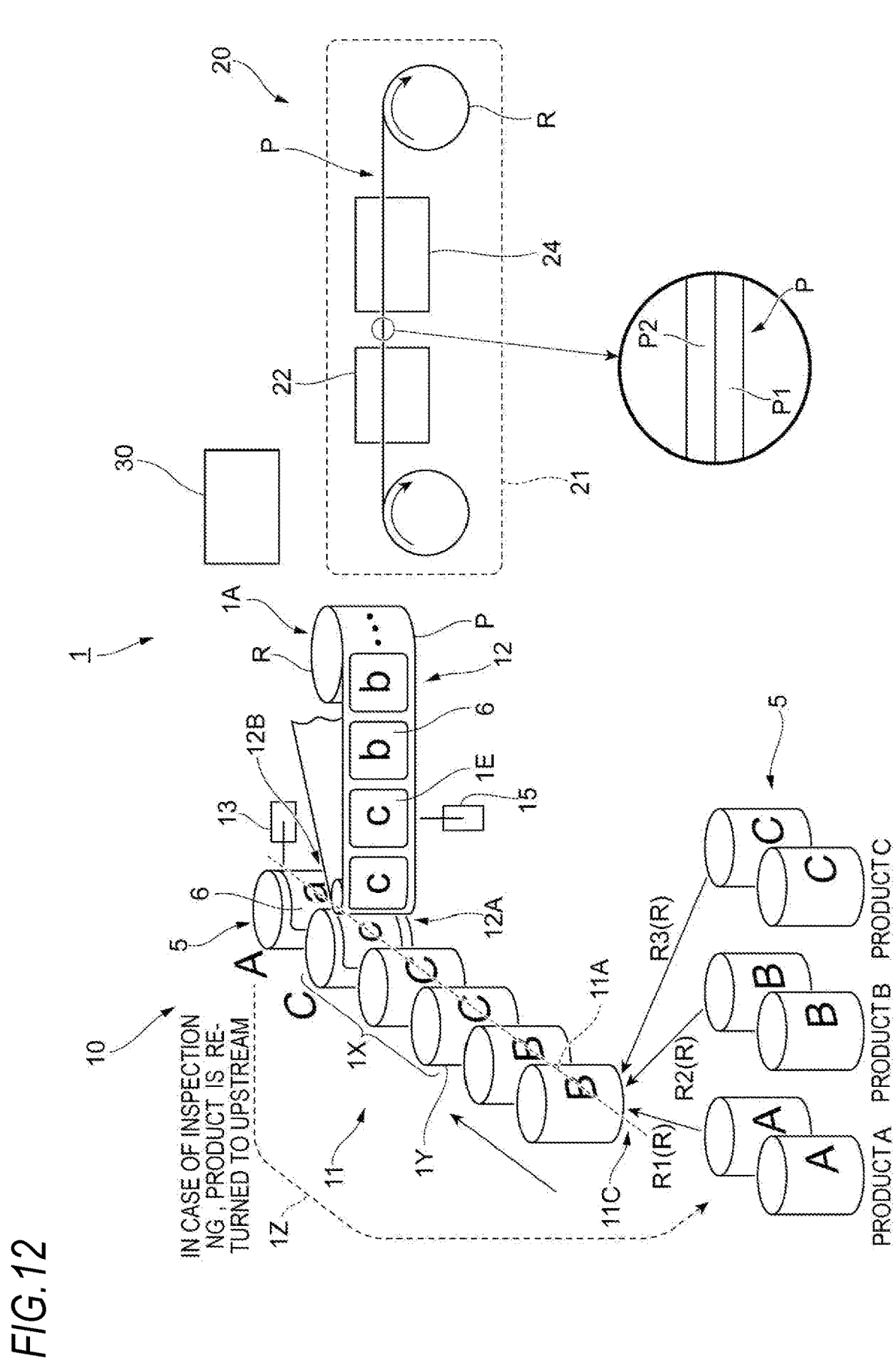
FIG. 12 is a view illustrating an overall configuration of a production system according to another exemplary embodiment.

FIG. 12 is a view illustrating an overall configuration of a production system 1 according to another exemplary embodiment.

In the production system 1 of the exemplary embodiment, a manufacturing apparatus 10 is provided to manufacture a product 5 tagged with a label 6 as an example of a print. In the production system 1, a print producing apparatus 20 is provided as an example of a production unit that produces the label 6.

In the production system 1, a management server 30 is provided to manage the manufacturing of the product 5 in the production system 1.

The management server 30 is connected to the manufacturing apparatus 10 and the print producing apparatus 20 via a communication line such as a local area network (LAN).

The manufacturing apparatus 10 and the print producing apparatus 20 are provided in the same factory. In the exemplary embodiment, the management server 30 is also provided in the factory where the manufacturing apparatus 10 and the print producing apparatus 20 are provided.

The manufacturing apparatus 10 and the print producing apparatus 20 may be provided at different places. The management server 30 may also be provided in a place different from the above described factory.

In the manufacturing apparatus 10, a single type of product 5 may be manufactured, or plural different types of products 5 may be manufactured.

In the exemplary embodiment, descriptions are made on a case where the plural types of products 5 are manufactured by the manufacturing apparatus 10. In this case, in the print producing apparatus 20, the plural types of labels 6 are produced.

In the manufacturing apparatus 10, a transport device 11 is provided as an example of a transport unit that sequentially transports the products 5. In the manufacturing apparatus 10, an attaching device 12 is provided to attach a print to the product 5 transported by the transport device 11.

In the exemplary embodiment, as the print, the label. 6 to be attached to the product 5 is exemplified, and the label 6 is attached (affixed) to the product 5 by the attaching device 12.

That is, in the exemplary embodiment, as a print to be attached to the product 5, the label 6 that is to be attached to the product 5 by adhesion is exemplified. The label 6 adheres to the product 5 by the attaching device 12.

In the manufacturing apparatus 10 of the exemplary embodiment, a product inspection device 13 is provided to inspect the product 5 attached with the label 6. In the manufacturing apparatus 10, a label inspection device 15 is provided to inspect the label 6 before attached to the product 5.

In the exemplary embodiment, as the print to be attached to the product 5, the label 6 is described as an example, but besides, a packaging member such as a box or a bag may also be cited as an example of the print. In this case, in the print producing apparatus 20, the packaging member is produced. In this case, the manufacturing apparatus 10 manufactures a product 5 having the main part of the product placed in the packaging member, or a product 5 having the main part of the product in which the product body is wrapped by the packaging member is manufactured.

In addition, an example of the print may also be a tag provided with a string, which is attached to the main part of a product by being hung on the main part of the product.

In the transport device 11, a main transport path 11A is provided through which the products 5 are sequentially transported.

Through the main transport path 11A, the products 5 are sequentially transported while aligned in a straight line. Through the main transport path 11A, the plural types of products 5 are sequentially transported while aligned in line.

In the transport direction of the products 5, at the upstream side of the main transport path 11A, plural branch transport, paths R are provided. Here, in the exemplary embodiment, as for the branch transport paths R, three branch transport paths R, branch transport paths R1 to R3 are provided.

Each of the branch transport paths R1 to R3 is disposed from the upstream side toward the downstream side in the transport direction of the products 5, and merge with the main transport path 11A at a junction 11C located at the downstream side in the transport direction of the products 5.

In the transport device 11, a delivery mechanism (not illustrated) is provided corresponding to each of the branch transport paths R1 to R3, which delivers the product 5 located on each of the branch transport paths R1 to R3 to the main transport path 11A.

Each delivery mechanism is constituted by, for example, a rotating roll (a rotating member) disposed below the product 5. When the roll Rotates, the product 5 located on each of the branch transport paths R1 to R3 is supplied to the main transport path 11A.

In the exemplary embodiment, the products 5 disposed on the branch transport paths R1 to R3, respectively, are different from each other. A product A is disposed on the branch transport path R1, a product B is disposed on the branch transport path R2, and a product C is disposed on the branch transport path R3.

In the exemplary embodiment, the branch transport paths R1 to R3 are provided, and the products 5 provided on the branch transport paths R1 to R3, respectively, are made different from each other.

Then, in the exemplary embodiment, the products 5 are fed to the main transport path 11A from each of the branch transport paths R1 to R3. That is, in the exemplary embodiment, the different products 5 located on the branch transport paths R1 to R3 are supplied to one main transport path 11A.

In the print producing apparatus 20, a transport device 21 is provided to transport continuous paper P. In the print producing apparatus 20, an image forming apparatus (printing apparatus) 22 is provided to form an image on the continuous paper P transported by the transport device 21.

In the image forming apparatus 22, an image is formed on the continuous paper P by using an inkjet printing method, an electrophotographic method or the like. The image formation method is not limited to the inkjet printing method or the electrophotographic method, but other methods may be employed.

The transport device 21 performs delivery of the continuous paper P from the continuous paper P in a rolled state to transport the continuous paper P to the image forming apparatus 22. The transport device 21 further transports the continuous paper P on which image formation has been completed by the image forming apparatus 22. Then, the transport device 21 finally winds up the continuous paper P, to produce a roll R.

The continuous paper P of the exemplary embodiment is constituted by backing paper P1, and label paper P2 which is placed on the backing paper P1 via an adhesive. The image forming apparatus 22 forms an image on a portion of the label paper P2 in the continuous paper P.

In the print producing apparatus 20, a cutting device 24 is provided to cut the label paper P2. The cutting device 24 is disposed at the downstream side of the image forming apparatus 22 in the transport direction of the continuous paper P.

In the exemplary embodiment, in the label paper P2, a portion located around each formed image is cut in an annular shape by the cutting device 24. Accordingly, in the exemplary embodiment, plural labels 6 are produced on the backing paper P1.

That is, in the cutting device 24, an annular cutter (not illustrated) is pressed against the portion located around each image in the label paper P2 to cut the label paper P2, so that the plural labels 6 are aligned on the backing paper P1.

In the exemplary embodiment, the cutting device 24 is provided within the print producing apparatus 20, but the cutting device 24 may be provided at a place different from the print producing apparatus 20. In this case, the roll R is conveyed to the cutting device 24, and the label paper P2 is cut.

The finished roll R (the labels 6) is conveyed to the manufacturing apparatus 10, and is provided in the manufacturing apparatus 10 as indicated by the reference numeral 1A.

Then, the continuous paper P is sequentially fed to an attachment position 12A so that the labels 6 on the continuous paper P are transported to the attachment position 12A.

Then, at the attachment position 12A, the labels 6 peel off from the backing paper P1, and the labels 6 are sequentially attached to the products 5 that are transported by the transport device 11.

In the exemplary embodiment, while the label 6 is being transported to the attachment position 12A, the label 6 is inspected by the label inspection device 15.

In the exemplary embodiment, as indicated by the reference numeral 12B, the transport direction of the continuous paper P rapidly changes at the attachment position 12A, and peeling-off of the labels 6 from the backing paper P1 is easily performed at the attachment position 12A.

After the label 6 is attached to the product 5, the product 5 attached (affixed) with the label 6 (hereinafter, referred to as "the tagged product 5") reaches the product inspection device 13, and in the product inspection device 13, the tagged product 5 is inspected.

Here, in the exemplary embodiment, in the product inspection device 13, a defect of the tagged product 5 is detected. Then, when a body portion of the tagged product 5 (a portion other than the label 6) is re-usable, after the label 6 is wasted, the body portion (the product 5) is returned to a corresponding branch transport path R (any one of the branch transport paths R1 to R3).

In order to re-attach the label 6 to the returned product 5, the management server 30 changes the plan of production of the products 5.

Therefore, in the exemplary embodiment, on the product 5 on which attachment of the label 6 was performed once, attachment of the label 6 is performed again. That is, on the product 5 on which an attachment processing of the label 6 was already performed, attachment of the label 6 is performed again.

The returning of the product 5 to the corresponding branch transport path R may be manually performed, or automatically performed by providing a transport device.

When the product 5 is returned to the branch transport path R, the sane type of label 6 as the label 6 (the label 6 determined to be defective) which was attached to the product 5 is re-printed in the print producing apparatus 20. That is, the label 6 corresponding to the type of the tagged product 5 that is determined to be defective is additionally produced.

More specifically, in the exemplary embodiment, when a defect of the product 5 is detected in the product inspection device 13, and the product 5 is returned to the branch transport path R, not only a plan of production of the products 5 but also a plan of production of the labels 6 is changed in the management server 30.

Then, the print producing apparatus 20 prints the label 6 based on the changed production plan. Accordingly, to the product 5 returned to the branch transport path R, the label 6 corresponding to the type of the product 5 is attached.

Here, as described above, when the product 5 is returned to the branch transport path R, an originally non-scheduled product 5 is provided on the branch transport path R.

In this case, unless the order of production of the labels 6 is changed, a different label 6 from the label 6 corresponding to the type of the product 5 may be attached to the product 5.

Thus, in the exemplary embodiment, as described above, when the product 5 is returned to the branch transport path R, the plan of production of the labels 6 (the order of production of the labels 6) is changed so that the label 6 corresponding to the type of the product 5 is attached to the product 5.

That is, in the exemplary embodiment, when the product 5 is returned to the branch transport path R, the order of production of the labels 6 is changed so that a predetermined correspondence relationship is made between the product 5 produced based on the changed production plan (the changed production plan), and the label 6 attached to the product 5.

That is, when the product 5 is returned to the branch transport path R, the plan of production of the products 5 is changed, but in the exemplary embodiment, the order of production of the labels 6 is changed so that a predetermined correspondence relationship is made between the product 5 produced based on the changed production plan and the label 6 attached to the product 5.

Accordingly, in the exemplary embodiment, a relationship between the product 5 produced based on the changed production plan and the label 6 attached to the product 5 becomes a predetermined correspondence relationship.

Meanwhile, in the exemplary embodiment, a defect of the tagged product 5 is detected by the product inspection device 13. Then, when the body portion of the tagged product 5 is not reusable (when a defect is occurring in the body portion itself), the entirety of the tagged product 5 including both the body portion of the product 5 and the label 6 is wasted.

In this case, since the product 5 is not returned to the branch transport path R, the production plan (the order of production of the labels 6) of the label 6 is not changed.

In the exemplary embodiment, also, in the case where a defect of the label 6 is detected in the label inspection device 15, the plan of production of the products 5 is changed, and also, the plan of production of the labels 6 is changed.

In this case as well, the product itself is usable, and the product 5 is returned to the branch transport path R. Thus, the plan of production of the products 5 is changed, and the plan of production of the labels 6 is changed.

Accordingly, in this case as well, the relationship between the product 5 produced based on the changed production plan and the label 6 attached to the product 5 becomes a predetermined correspondence relationship.

In the exemplary embodiment, when a defect of the label 6 is detected by the label inspection device 15, the label 6 is not attached to the product 5. Then, in this case, the product 5 not attached with the label 6 is returned to the branch transport path R.

Here, in order not to attach the label 6 to the product 5, for example, a processing of pressing the label 6 against the backing paper P1 side and returning the label 6 to the backing paper P1 side, is performed by the attaching device 12.

By omitting a peeling-off processing of the label 6, the label 6 may not be attached to the product 5.

Specifically, in the peeling-off of the label 6 from the backing paper P1, a peeling member (not illustrated) may be caught on the front end portion of the label 6 so as to peel off the label 6 from the backing paper P1. In this case, by omitting this hooking-up (peeling-off), the label 6 may not be attached to the product 5.

FIG. 13 is a view illustrating inspection items by the product inspection device 13.

In the product inspection device 13, as the inspection item, four inspection items, "label printing," "label processing," "label sticking," and "product" are set, and inspection is performed on each of the four inspection items.

In the "label printing," it is checked whether print contents of the label 6 satisfy predetermined conditions. Specifically, in the "label printing," it is checked whether predetermined conditions are satisfied on each of items such as character loss or blurring, bar code error, color shift or density unevenness, black spot, color spot, streaks, and stains.

In the "label processing," it is checked whether the processing of the label 6 is performed satisfying predetermined conditions.

Specifically, in the "label processing," on each of items such as die-cutting defect, print/removal misalignment, and laminate failure, it is checked whether such a defect is occurring.

In the "label sticking," it is checked whether sticking of the label 6 is performed satisfying predetermined conditions.

Specifically, in the "label sticking," on each of items such as label peeling or lifting, and sticking misalignment, it is checked whether a defect is occurring. In the "label sticking," it is checked whether a combination of the product 5 with the label 6 is proper.

In the "product," it is determined whether a defect is occurring in the product itself (the main part of the product itself). Specifically, in the inspection item "product," as to whether, for example, the product 5 is deformed, inspection is performed on each of various inspection items such as a weight of the product 5, and contents of the product 5.

The inspection by the product inspection device 13 may be performed by using an existing technique. Specifically, image-capturing on the tagged product 5 may be performed by, for example, a camera such as a CCD, and a processing of matching the result contents of the image-capturing to a previously prepared pattern may be performed so as to determine whether each of the above-described inspection items is satisfied.

Here, in the exemplary embodiment, when it is determined that predetermined conditions are not satisfied on any one of "label printing," "label processing," and "label sticking" as inspection items related to the label 6, as described above, the product 5 is returned to the branch transport path R, and the plan of production of the products 5 and the plan of production of the labels 6 are changed.

That is, when it is determined that predetermined conditions are not satisfied on any one of "label printing," "label processing," and "label sticking" as inspection items related to the label 6, after the label 6 is peeled off, the body portion of the product 5 is returned to the corresponding branch transport path R as described above.

In this case, the plan of production of the products 5 and the plan of production of the labels 6 are changed. Accordingly, even after a production change of the product 5 is made, the label 6 corresponding to the type of the product 5 is attached to the product 5.

When it is determined that predetermined conditions are not satisfied on "product" as an inspection item related to the product 5, since the product 5 is not returned to the branch transport path R, in this case, the plan of production of the products 5 and the plan of production of the labels 6 are not changed.

In the label inspection device 15, inspection is performed on "label printing," "label processing," and "label sticking" as inspection items related to the label 6.

Then, when there is a label 6 determined to be detective, the label 6 is not attached to the product 5.

In this case, the product 5 scheduled to be attached with the label 6 is returned to the corresponding branch transport path R, and the plan of production of the products 5 and the plan of production of the labels 6 are changed.

Figure 14:
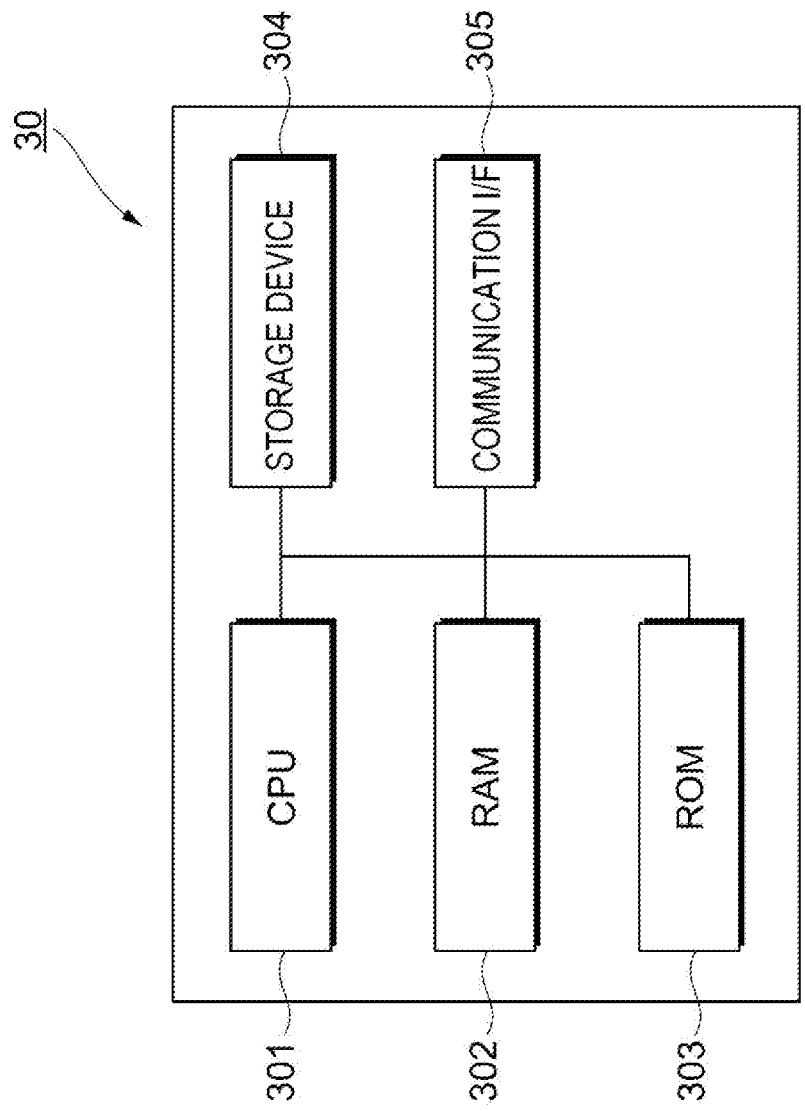
FIG. 14 is a view illustrating a hardware configuration of a management server.

FIG. 14 is a view illustrating a hardware configuration of the management server 30.

The management server 30 as an example of an information processing apparatus is constituted by a computer device, and a central processing unit (CPU) 301, a random access memory (RAM) 302, and a read only memory (ROM) 303 are provided in the management server 30. Also, a storage device 304 constituted by a hard disk device or the like is provided. A communication interface (communication I/F) 305 is provided in the management server 30 to communicate with the outside.

A program to be executed by the CPU 301 may be provided to the management server 30 while being stored in a computer-readable recording medium such as a magnetic recording medium (e.g., a magnetic tape, a magnetic disk), an optical recording medium (e.g., an optical disk), an optical magnetic recording medium, or a semiconductor memory. The program to be executed by the CPU 301 may be downloaded to the management server 30 by using a communication unit such as the Internet.

Figure 15:
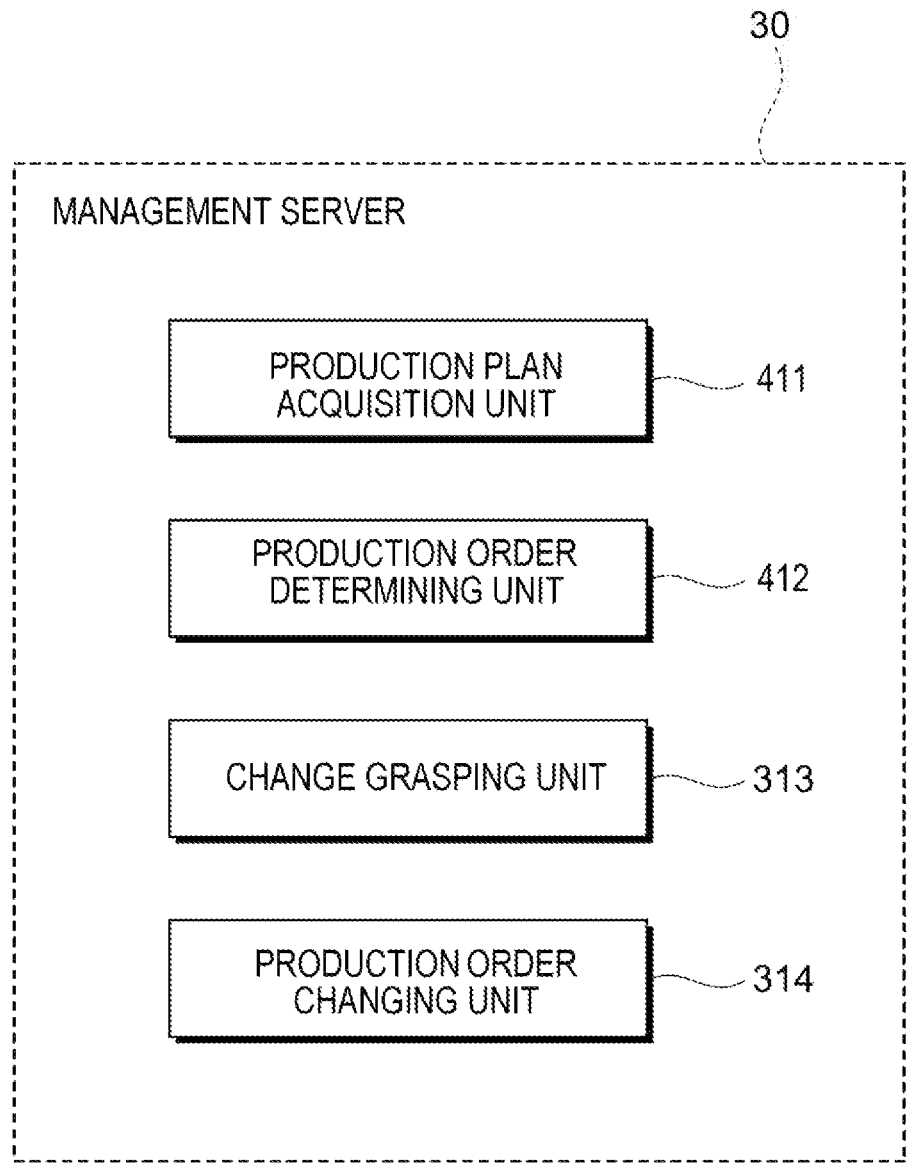
FIG. 15 is a view illustrating functional units realized by a CPU or the like of the management server.

FIG. 15 is a view illustrating functional units realized by the CPU 301 or the like of the management server 30. In FIG. 15, only functional units related to manufacturing of the tagged product 5 are illustrated.

As illustrated in FIG. 15, the management server 30 includes a production plan acquisition unit 411, a production order determining unit 412, a change grasping unit 313, and a production order changing unit 314.

The production plan acquisition unit 411 as an example of a production plan acquisition unit accepts information input through a PC or the like by an operator, and acquires a plan of production of the products 5.

More specifically, in the exemplary embodiment, as described above, as for plural types of products 5, plural types of products 5 to be sequentially attached with the labels 6 are produced. The production plan acquisition unit 411 acquires the production plan on the plural types of products 5. Specifically, the production plan acquisition unit 411 acquires a production order and the quantity of production for each of the types of the tagged products 5.

The production order determining unit 412 as an example of a determining unit determines the order of production of the labels 6 to be attached to each of the plural products 5, based on the production plan acquired by the production plan acquisition unit 411.

More specifically, in the exemplary embodiment, as described above, a roll R including the plural labels 6 is produced, and for each roll R, the order of production of the labels 6 is determined.

In the print producing apparatus 20, the labels 6 are produced in the production order determined by the production order determining unit 412.

The change grasping unit 313 as an example of a grasping unit grasps a change of the plan of production of the plural types of products 5 to be manufactured by the manufacturing apparatus 10. Specifically, the change grasping unit 313 accepts information input through a PC or the like by the operator to grasp the change of the plan of production of the products 5.

More specifically, in the exemplary embodiment, as described above, the product 5 from which the label 6 is peeled off may be returned to the branch transport path R. In this case, for example, the operator changes the production plan (inputs the information on the change of the production plan).

The change grasping unit 313 acquires the information on the change of the production plan made by the operator, and grasps the change of the plan of production of the products 5.

The production order changing unit 314 as an example of a changing unit changes the order of production of the labels 6 based on the change of the production plan grasped by the change grasping unit 313.

More specifically, as described above, for example, when the product 5 is returned to the branch transport path R, the production order changing unit 314 changes the order of production of the labels 6 so that the same type of label 6 as the label 6 which was attached to the product 5 may be additionally produced, and may be attached to the returned product 5.

Figure 16:
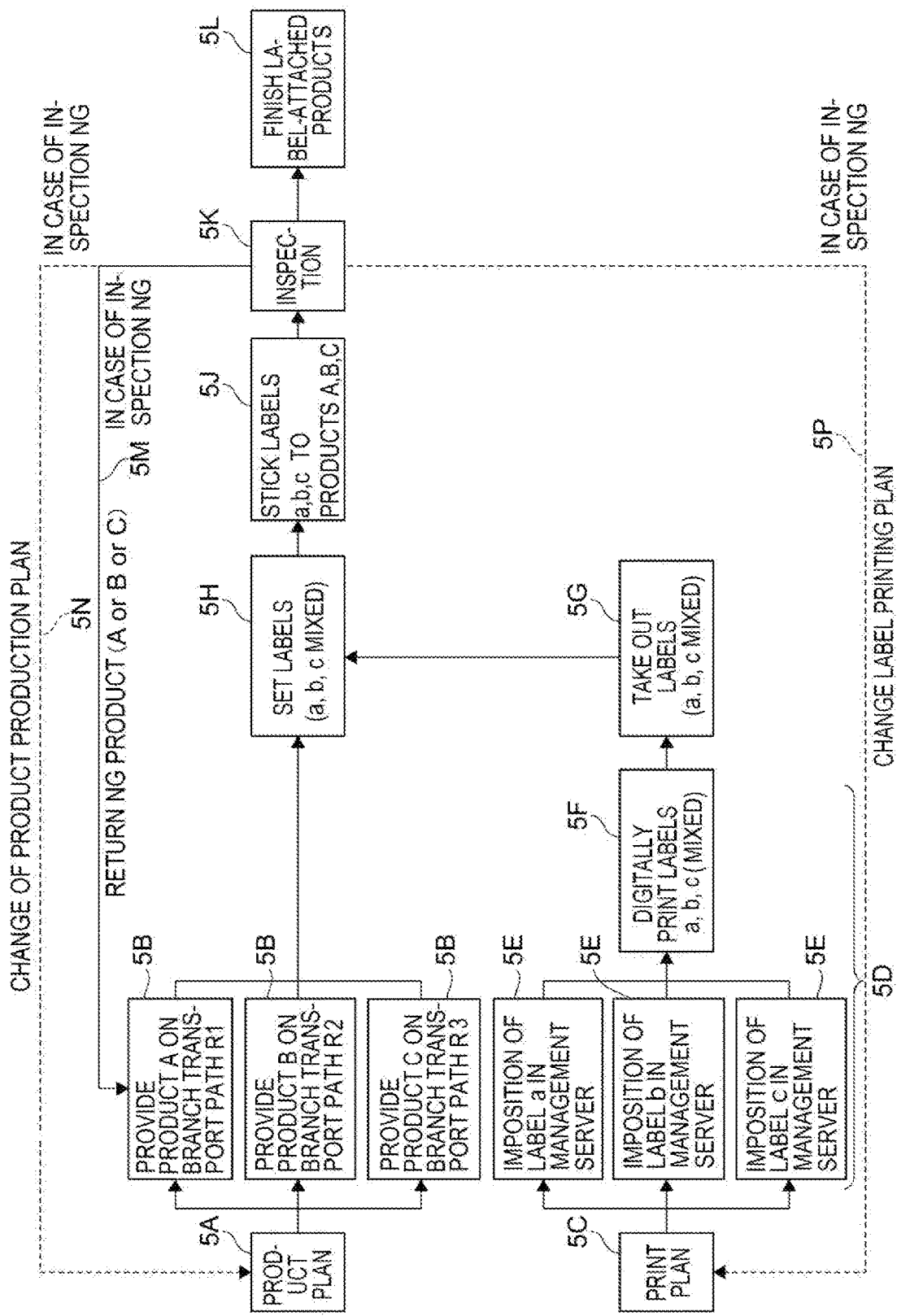
FIG. 16 is a view illustrating a flow of a process in the production system.

FIG. 16 is a view illustrating a flow of a process in the production system 1.

First, in the exemplary embodiment, an operator sets up a plan of production of the products 5 (see the reference numeral 5A), and inputs production plan information as information on the production plan by operating a PC or the like. Then, in the exemplary embodiment, the production plan acquisition unit 411 acquires the production plan (the production plan information).

Subsequently, the operator disposes the corresponding products 5 on each of the branch transport paths R (see the reference numeral 5B).

In the exemplary embodiment, the production order determining unit 412 creates a plan of production of the labels 6 based on the production plan information acquired by the production plan acquisition unit 411 (see the reference numeral 5C).

Specifically, the production order determining unit 412 determines the order of production of the labels 6 to be attached to each of the products 5 to be produced by the manufacturing apparatus 10, based on the production plan information acquired by the production plan acquisition unit 411.

Then, in the exemplary embodiment, the print producing apparatus 20 produces the labels 6 based on the production order (see the reference numeral 5D).

Specifically, in the exemplary embodiment, first, image imposition is performed corresponding to each of the labels 6 present as plural types of labels (see the reference numeral 5E). Then, after this imposition is performed, printing of the labels 6 (digital printing) is started (see the reference numeral 5F).

Accordingly, in the exemplary embodiment, the order of production of plural types of products 5 to be produced through subsequent attachment of labels 6 agrees with the order of production of the labels 6 to be produced by the print producing apparatus 20 according to each of the plural types.

That is, the production order determining unit 412 of the exemplary embodiment determines the order of production of the labels 6 so that the order of production of the plural types of products 5 to be produced through sequential attachment of labels 6 agrees with the order of production of the labels 6 to be produced by the print producing apparatus 20 according to each of the plural types.

Thereafter, in the exemplary embodiment, the produced labels 6 (a roll R) are taken out from the print producing apparatus 20 (see the reference numeral 5G), and then are set in the manufacturing apparatus 10 (see the reference numeral 5H).

Then, in the manufacturing apparatus 10, the products 5 are transported, and the labels 6 are transported, and attachment of the label 6 to each of the products 5 is started (see the reference numeral 5J).

In the exemplary embodiment, as indicated by the reference numeral 5K, the label inspection device 15 inspects the label 6, and the product inspection device 13 inspects the product 5 on which the attachment has been completed.

Then, finally, the tagged product 5, which is the product 5 attached with the label 6, is finished (see the reference numeral 5L).

Here, in the exemplary embodiment, as described above, when the product inspection device 13 detects a defect of the product 5 (detects only a defect of the label 6), after the label 6 is peeled off, as indicated by the reference numeral 5M, the product 5 is returned to the branch transport path R corresponding to the type of the product 5.

In this case, as indicated by the reference numeral 5N, in the management server 30, the plan of production of the products 5 is changed. Specifically, the plan of production of the products 5 is changed so that the returned product 5 may be supplied to the main transport path 11A.

In this case, in order to attach the label 6 to the returned product 5, as indicated by the reference numeral 5P, the plan of production of the labels 6 is also changed in the management server 30.

Figure 17:
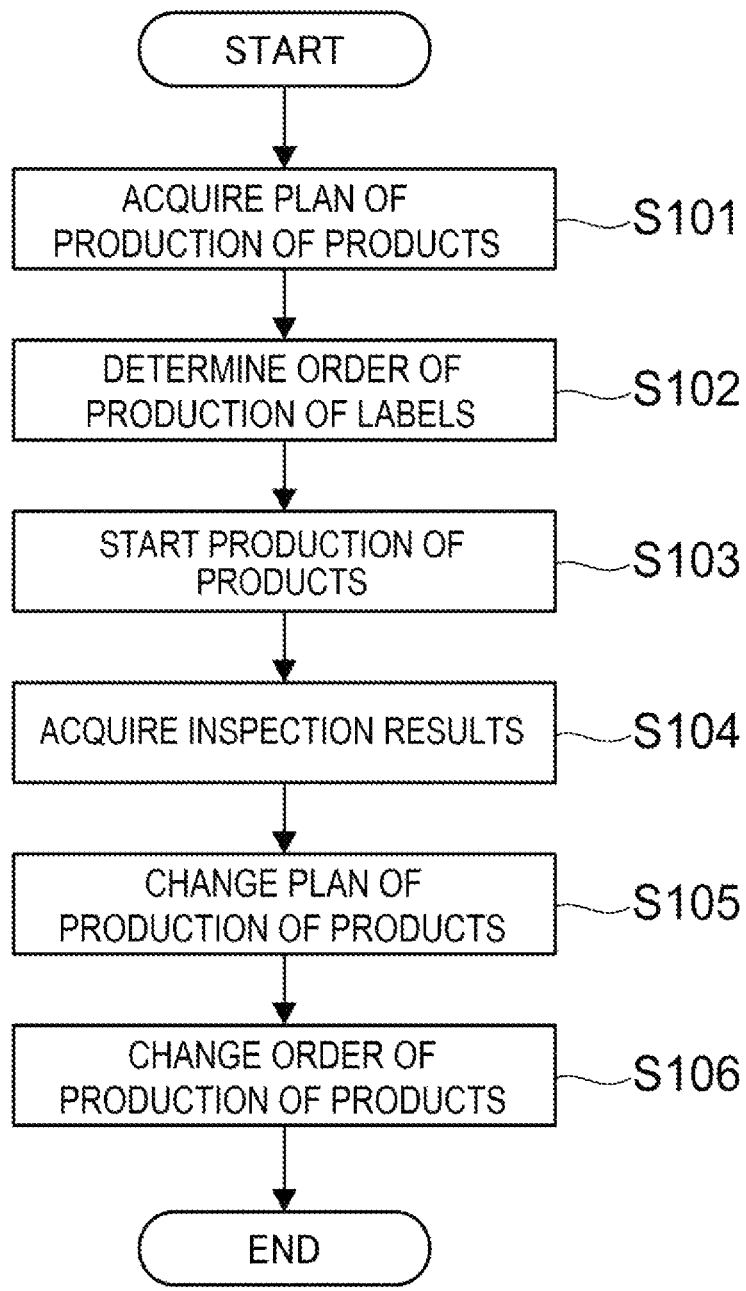
FIG. 17 is a view illustrating a flow of a process executed by the management server.

FIG. 17 is a view illustrating a flow of a process executed by the management server 30.

In the exemplary embodiment, first, the production plan acquisition unit 411 acquires a plan of production of the products 5 (step 101), and the production order determining unit 412 determines the order of production of the labels 6 based on the production plan (step 102). That is, the production order determining unit 412 creates a plan of production of the labels 6.

Subsequently, in the exemplary embodiment, based on the plan of production of the labels 6, the labels 6 (roll R) are produced, and subsequently, the produced labels 6 are set in the manufacturing apparatus 10 so that production of the products 5 is started (step 103).

Then, when the production of the products 5 is started, inspection by the label inspection device 15 and inspection by the product inspection device 13 are sequentially performed, and then the inspection results are acquired by each of the product inspection device 13 and the label inspection device 15 (step 104).

Then, in the exemplary embodiment, for example, when a defect of only the label 6 is detected by the product inspection device 13, or a defect (a defect on the label 6) is detected by the label inspection device 15, and, as described above, the product 5 is returned, the plan of production of the products 5 is changed (step 105), and the order of production of the labels 6 is changed (step 106).

Thereafter, the labels 6 are sequentially produced in the changed production order, and the products 5 are produced based on the changed production plan.

In the process of the exemplary embodiment, a stock of the labels 6 is not secured in advance, but as necessary, the labels 6 are produced.

Here, when a defect of the labels 6 occurs as described above, a lack of stock of the labels 6 is caused. In order to prepare for such a case, tier example, preparing a predetermined number of labels 6, as a stock for each of the types of the products 5 is taken into consideration.

However, in this case, the labels 6 are stocked, and a cost for a stock management is likely to occur. In particular, when the types of products 5 are plural, accordingly, the types of the labels 6 may also be plural, and thus, a cost for a stock management may be increased.

In contrast, in the exemplary embodiment, a stock of the labels 6 is not prepared in advance, but the order of production of the labels 6 is determined based on the plan of production of the products 5 to produce the labels 6.

In the exemplary embodiment, the labels 6 are not prepared in advance to prepare for occurrence of a defect of the label 6, but the label 6 is additionally produced according to the occurrence of a defect of the label 6.

Accordingly, in the exemplary embodiment, it is possible to manufacture the products 5 while suppressing an occurrence of a stock of the labels 6.

In the exemplary embodiment, when the labels 6 are to be consecutively attached to one type of products 5 among the plural types and one type of plural products 5 are to be consecutively produced, the production order determining unit 412 determines the production order so that the labels 6 corresponding to one type are consecutively produced in a quantity corresponding to the quantity of production of the one type of products 5.

Specifically, in the exemplary embodiment, as indicated by the reference numeral 1X in FIG. 12, for example, three products C are consecutively produced. However, in the exemplary embodiment, accordingly, three labels 6 corresponding to the products C are consecutively produced corresponding to the quantity of production.

Accordingly, a predetermined relationship is made between these three products C and the labels 6 to be attached to the products C, respectively.

In the exemplary embodiment, the production order determining unit 412 determines the order of production of the labels 6 so that the types of the labels 6 are switched according to switching of the types of the products 5 to be produced with the sequentially affixed labels 6.

Accordingly, in this case as well, a predetermined relationship is made between the products 5 and the labels 6 to be attached to the products 5.

Specifically, in the exemplary embodiment, as illustrated in FIG. 12, for example, a product subsequently to the product C indicated by the reference numeral 1Y is the product B, and the types of the products 5 are switched halfway, but, in the exemplary embodiment, according to this switching, the types of the labels 6 to be aligned on the continuous paper P are also switched.

Specifically, the label 6 which is located immediately after the label 6 (the label 6 to be attached to the product C) indicated by the reference numeral 1E becomes the label 6 corresponding to the product B, and the types of the labels 6 are switched.

In the exemplary embodiment, the production plan acquisition unit 411 acquires, as the production plan, at least information on the quantity of production and the production order for each of the plural types of products 5.

Then, the production order determining unit 412 of the exemplary embodiment determines the order of production of the labels 6 based on the information acquired by the production plan acquisition unit 411 on the quantity of production and the production order for each of the types.

Specifically, in the exemplary embodiment, as illustrated in FIG. 12, one product A is produced, subsequently, three products C are produced, and then, two products B are produced. However, in the exemplary embodiment, information on this production is acquired by the production plan acquisition unit 411. That is, information on the quantity of production for each of the types of the products 5, and the production order for each of the types of the products 5 is acquired.

Then, in the exemplary embodiment, the production order determining unit 412 determines the order of production of the labels 6 based on the acquired information on the quantity of production for each of the types and the production order for each of the types.

Accordingly, in the exemplary embodiment, one label 6 corresponding to the product A is firstly produced, subsequently, three labels 6 corresponding to the products C are produced, and, finally, two labels 6 corresponding to the products B are produced.

In the exemplary embodiment, as described above, the production order changing unit 314 changes the order of production of the labels 6 based on the change of the plan of production of the products 5 which is grasped by the change grasping unit 313.

Specifically, in the exemplary embodiment, as described above, the product 5 is returned to the branch transport path R, and accordingly, the plan of production of the products 5 is changed. Meanwhile, in this case, the production order changing unit 314 changes the order of production of the labels 6.

More specifically, FIG. 12 illustrates, as an example, a case where, as indicated by the reference numeral 1Z, the product A is returned. In this case, an originally non-scheduled product A is produced, and, in the exemplary embodiment, the production plan on the products 5 is changed.

Then, in the exemplary embodiment, in this case, the order of production of the labels 6 is changed. Accordingly, when the returned product 5 reaches the attachment position 12A, the label 6 corresponding to the type of the product 5 is supplied to the attachment position 12A.

In the exemplary embodiment, when a change is made to the production plan to additionally produce the product 5, the production order changing unit 314 changes the production order so that the label 6 corresponding to the type of the additionally produced product 5 is attached to the product 5.

Here, for example, in the case where the originally non-scheduled new product 5 is provided on the branch transport path R, when the order of production of the labels 6 is not changed, a different label 6 from the label 6 corresponding to the type of the product 5 may be attached to the product 5.

Thus, in the exemplary embodiment, as described above, when a change is made to the production plan to additionally produce the product 5, the production order changing unit 314 changes the order of production of the labels 6 so that to the additionally produced product 5, the label 6 corresponding to the product 5 may be supplied.

In the exemplary embodiment, in the print producing apparatus 20 functioning as a production unit, the labels 6 are produced in the production order determined by the production order determining unit 412, and a production article on which the plural produced labels 6 are aligned in the production order is produced.

Specifically, in the print producing apparatus 20, the labels 6 are produced in the above-described production order on the continuous paper P, and the roll R on which the labels 6 are aligned in this production order is produced. Then, in the exemplary embodiment, the roll R is set in the manufacturing apparatus 10.

Accordingly, in the exemplary embodiment, for example, as compared to a ease where the production article as a bundle in Which the labels 6 are stacked is provided to the manufacturing apparatus 10, it is possible to more simply provide the labels 6 to the manufacturing apparatus 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A production system comprising:
    a production plan acquisition unit that acquires a plan of production of plural types of products to be produced through sequential attachment of prints;
    a determining unit that determines order of production of the prints to be attached to the plural types of products, respectively, based on the production plan acquired by the production plan acquisition unit; and
    a production unit that produces the prints in the production order determined by the determining unit.

2. The production system according to claim 1, wherein the determining unit determines the order of production of the prints so that order of production of the plural types of products to be produced through sequential attachment of the prints agrees with the order of production of the prints to be produced by the production unit according to each of the plural types.

3. The production system according to claim 2, wherein when the prints are consecutively attached to one type of products among the plural types and a plurality of products of the one type are consecutively produced, the determining unit determines the production order so that the prints corresponding to the one type are consecutively produced in a quantity corresponding to the quantity of production of the one type of products.

* * * * *